United States Patent
Wu

(10) Patent No.: US 10,739,116 B2
(45) Date of Patent: Aug. 11, 2020

(54) AUTOMATED DETONATION OF FIREWORKS

(71) Applicant: Titan International Technologies, Ltd., Hong Kong (CN)

(72) Inventor: Kevin Wu, Hong Kong (CN)

(73) Assignee: Titan International Technologies, Ltd., Hong Kong (CN)

( * ) Notice: Subject to any disclaimer, the term of this patent is extended or adjusted under 35 U.S.C. 154(b) by 0 days.

(21) Appl. No.: 15/690,736

(22) Filed: Aug. 30, 2017

(65) Prior Publication Data

US 2018/0066927 A1 Mar. 8, 2018

Related U.S. Application Data

(60) Provisional application No. 62/383,277, filed on Sep. 2, 2016, provisional application No. 62/488,297, filed on Apr. 21, 2017.

(51) Int. Cl.
| | |
|---|---|
| *F42B 4/00* | (2006.01) |
| *F42B 4/06* | (2006.01) |
| *F42B 4/24* | (2006.01) |
| *F42C 13/00* | (2006.01) |
| *F42C 17/00* | (2006.01) |
| *F42C 11/00* | (2006.01) |

(Continued)

(52) U.S. Cl.
CPC ............. *F42B 4/00* (2013.01); *F42B 4/24* (2013.01); *F42C 11/001* (2013.01); *F42C 17/00* (2013.01); *H04M 1/72533* (2013.01); *F42B 4/06* (2013.01); *F42C 13/00* (2013.01); *H04L 67/125* (2013.01); *H04L 67/303* (2013.01); *H04M 1/7253* (2013.01); *H04W 4/80* (2018.02)

(58) Field of Classification Search
CPC .......... F42C 13/00; F42C 17/00; F42C 11/00; F42C 11/001; F42B 4/00; F42B 4/06; F42B 4/14; F42B 4/24; H04M 1/72533; H04M 1/7253; H04L 67/125; H04L 67/303; H04W 4/80
USPC ........................................................ 102/215
See application file for complete search history.

(56) References Cited

U.S. PATENT DOCUMENTS

| | | |
|---|---|---|
| 5,627,338 A | 5/1997 | Poor et al. |
| D540,318 S | 4/2007 | Wang |

(Continued)

FOREIGN PATENT DOCUMENTS

| | | |
|---|---|---|
| CN | 203881228 U | 10/2014 |
| CN | 204421763 U | 6/2015 |

(Continued)

OTHER PUBLICATIONS

Machine translation of CN105872251A; Wang et al. (Year: 2016).*

(Continued)

*Primary Examiner* — James S Bergin
(74) *Attorney, Agent, or Firm* — Womble Bond Dickinson (US) LLP

(57) ABSTRACT

A fireworks kit can have a set of fireworks having multiple fireworks of different types and a plurality of detonators in communication with the fireworks that are configured to launch or detonate a firework attached thereto. A remote controller or mobile device can be in communication with the detonators and operable to provide dynamic or user customizable control of detonation, launching, or ignition of the fireworks.

20 Claims, 14 Drawing Sheets

(51) Int. Cl.
*H04M 1/725* (2006.01)
*H04W 4/80* (2018.01)
*H04L 29/08* (2006.01)

(56) References Cited

U.S. PATENT DOCUMENTS

| | | | |
|---|---|---|---|
| 7,493,859 B2 | 2/2009 | Russell | |
| 7,597,047 B2 * | 10/2009 | Doyle | F41A 33/04 102/355 |
| 8,118,157 B1 * | 2/2012 | Piccolin | F42B 4/20 102/343 |
| 8,365,665 B2 * | 2/2013 | Risner | F42B 3/10 102/215 |
| D696,265 S | 12/2013 | d'Amore | |
| 8,600,712 B1 | 12/2013 | Harvey | |
| D713,416 S | 9/2014 | Lee | |
| D753,685 S | 4/2016 | Zimmerman | |
| D768,707 S | 10/2016 | Gagnier | |
| D781,311 S | 3/2017 | Rad | |
| D789,382 S | 6/2017 | Chaudhri | |
| D791,123 S | 7/2017 | Wieser | |
| D797,099 S | 9/2017 | Wieser | |
| D805,541 S | 12/2017 | Juliano | |
| D841,678 S | 2/2019 | Wu | |
| 10,260,846 B1 * | 4/2019 | Fish | F42B 4/14 |
| 2003/0070572 A1 * | 4/2003 | Tang | F41A 19/65 102/349 |
| 2007/0100514 A1 * | 5/2007 | Park | B60R 25/00 701/2 |
| 2008/0046910 A1 | 2/2008 | Schultz et al. | |
| 2012/0210897 A1 | 8/2012 | Johnson, Jr. | |
| 2013/0192486 A1 | 8/2013 | Ruggiero | |
| 2014/0238259 A1 * | 8/2014 | Son | F42B 4/14 102/335 |
| 2015/0041554 A1 | 2/2015 | Aguilera Sanchez | |
| 2016/0011726 A1 | 1/2016 | Felt | |
| 2016/0337963 A1 | 11/2016 | Nabki | |
| 2016/0360116 A1 | 12/2016 | Penha | |

FOREIGN PATENT DOCUMENTS

| | | |
|---|---|---|
| CN | 105872251 A | 8/2016 |
| EP | 0429229 A2 | 5/1991 |
| WO | WO 0122180 A1 | 3/2001 |

OTHER PUBLICATIONS

International Preliminary Report on Patentability and Written Opinion of the International Searching Authority of International Application No. PCT/IB2017/001055 dated Mar. 14, 2019.
International Search Report and Written Opinion for related PCT application No. PCT/IB2017/001055, dated Dec. 25, 2017.
Short Paper: A Dangerous 'Pyrotechnic Composition': Fireworks, Embedded Wireless and Insecurity-by-Design, Costin et al., Jul. 2014, In Proceedings of the ACM Conference on Security and Privacy in Wireless and Mobile Networks, Oxford, UK.
MK802 and IPhone: a fireworks remote control, Internet of Things and Tiny PC, Aug. 2, 2012, available at http://www.yoctopuce.com/EN/article/mk802-and-iphone-a-fireworks-remote-control.
Internet Control Firing System OmegaFire—RFRemotech Fireworks Firing System, Guangzhou Aifusheng Electronic Technology Co., Ltd, May 20, 2016, available at http://www.rfremoteoh.com/OmegaFire.html.
Hoffman, Michael F. (Hoffman Warnick LLC); Letter re: U.S. Appl. No. 15/690,736; pp. 1-13; Dec. 27, 2019.
YouTube video clip entitled "*Make your own Remote Bluetooth Firework Igniter*"; https://www.youtube.com/watch?v=ScZfuQxol_s; Sep. 12, 2015.
GreatScottLab; https://www.instructables.com/id/Remote-Bluetooth-Firework-Igniter/; "*Remote Bluetooth Firework Igniter*"; Sep. 15, 2015.
Web Archive; Wayback Machine; GreatScottLab; "https://www.instructables.com/id/Remote-Bluetooth-Firework-Igniter"; https://web.archive.org/20150915013847/https://www.instructables.com/id/Remote-Bluetooth-Firework-Igniter/; Sep. 15, 2015.
YouTube video clip entitled "*Fireworks with a Smart Phone (FireTEK Compact)*"; https://www.youtube.com/watch?v=XqtgFc_KFuo; Apr. 30, 2016.
FireTEK; *Fireworks with a Smart Phone (FireTEK Compact)*; http://www.pyrotalk.com/bulletin/archive/index.php/t-4569.html; Apr. 30, 2016.
VBulletin; Thread: Fireworks with a Smart Phone (FireTEK Compact Model); http://www.pyrotalk.com/bulletin/showthread.php?4569.html; Apr. 30, 2016.
FireTEK Firing Made Easy; Products; Technical Specifications; http://ftek.eu/products/; Jan. 21, 2016.
Web Archive; Wayback Machine; FireTEK Firing Made Easy; Products; Technical Specifications; "http://ftek.edu/products/#"; https://web.archive.org/web/20160121185120/http://ftek.eu/products/#; Jan. 21, 2016.
Pyromate Advanced Pyrotechnic Firing Systems; http://www.pyromate.com/smartshow-software,htm; Jun. 10, 2004.
Web Archive; Wayback Machine; Pyromate Advanced Pyrotechnic Firing Systems; "http:/www.pyremate.com/smartshow-software.htm"; https://web.archive.org/web/20040610120140/http:/www.pyromate.com/smartshow-software.htm; Jun. 10; 2004.
Pyromate Inc. Firing Systems; Smart Show Instructions; http://www.pyromate.com/PDF/SmartFire%20Instructions.PDF; Jun. 10, 2004.
Infinity Visions; Visual Show Director (Version 8.3.0); http://www.infinityvisions.net/software/visual-show-director; Nov. 13, 2015.
YouTube video clip entitled "*VisualShowDirector 8 Addressing for the Galaxis Firing System: www.infinityvisions.net*"; https://www.youtube.com/watch?v=Yku-BUKEYoU; Nov. 13, 2015.
Web Archive; Wayback Machine; Cobra Wireless Firing Systems; Cobra Show Creator: https://web.archive.org/web/20150510221910/http://www.cobrafiringsystems.com/index.php?route=product/product&product_id=140; May 10, 2015.
Finale Fireworks; http://www.finalefireworks.com/; Dec. 19, 2011.
Web Archive; Wayback Machine; Finale Fireworks; "http://www.finalefireworks.com/"; https://web.archive.org/web/20111219124314; Dec. 19, 2011.

* cited by examiner

AUTOMATED DETONATION OF FIREWORKS

CROSS-REFERENCE TO RELATED APPLICATIONS

This application claims the benefit of U.S. Provisional Patent Application No. 62/383,277 filed Sep. 2, 2016, and U.S. Provisional Patent Application No. 62/488,297 filed Apr. 21, 2017.

INCORPORATION BY REFERENCE

The disclosures of U.S. Provisional Patent Application No. 62/383,277 filed Sep. 2, 2016, and U.S. Provisional Patent Application No. 62/488,297 filed Apr. 21, 2017, are hereby incorporated by reference as if presented herein in their entireties.

TECHNICAL FIELD

The present disclosure relates to fireworks or pyrotechnics and, one aspect, relates to fireworks detonation and control systems for automated fireworks displays or shows.

BACKGROUND

Fireworks and pyrotechnics are extremely popular; and, in many countries, fireworks shows have been incorporated into the fabric of national holidays, weddings, birthdays, athletic events, or other occasions. In addition to public displays, private individuals often host their own private shows or displays; however, such private shows/displays can be dangerous, especially when the individuals manually ignite fireworks and then quickly try to get clear prior to detonation. Sadly, it is common for serious injuries to occur, such as loss of limbs or figures and/or severe burns.

SUMMARY

Briefly described, the present disclosure is, in one aspect, directed to fireworks or pyrotechnics that can, for example, be part of a kit. The kit may include a plurality of fireworks that can be connected to one or more firing modules or detonator systems in communication with a remote controller or mobile device. The mobile device can be operable to provide customizable and/or dynamic control of detonation, ignition, or activation of the fireworks. The fireworks can include an assortment of various fireworks, such as one or more fountains; aerial shells; smoke, noise, or flash devices; etc. The remote control or mobile device can have a selectable display or one or more mechanical, push-buttons that are operable or selectable to allow a user to develop or create a custom fireworks display or show. The plurality of fireworks can be detonated according to a predetermined/predefined sequence or pattern, and/or can be launched and detonated generally to correspond to one or more aspects of a song or other played audio. The firing module or detonator system may include at least one detonator or detonation module that has, or is in communication with, one or more igniting mechanisms, such as a heating element, configured to light, ignite, or otherwise activate fuses of the fireworks. The firing module also may include a receiver that is in communication with a transmitter of the remote control or mobile device to receive one or more control signals from the remote control/mobile device and execute the custom fireworks display or show. The remote controller/mobile device may, optionally, be in communication with a server that stores information related to the fireworks and/or preset or manufacturer created shows or displays that can be accessed by, or loaded onto, the mobile device through the network.

In another aspect, a mobile control system for a fireworks detonation system or firing module may be provided. The mobile control system may comprise a mobile device, for example, a mobile phone, tablet or other suitable mobile device, having a display with one or more selectable areas or icons, though the mobile device also may have one or more selectable, mechanical buttons or other suitable input devices/mechanisms. The mobile control device may access an application from a memory of the mobile device, or from memory of a server in communication with the mobile device via a network. The application may display a plurality of display screens with areas, icons, or tabs that are selectable to facilitate mobile control of a fireworks detonation system in communication with the mobile device. A user may select the one or more areas or icons on the display screen(s) to create one or more predefined/predetermined custom or dynamic displays or shows, in which the fireworks can be launched and/or detonated according to a predetermined/predefined sequence or in a manner such that the fireworks can be launched or detonated to generally correspond to one or more aspects of a song or other played audio. The firing module or detonation system may include a series of detonators or detonation modules in communication with a receiver operable or otherwise configured to receive one or more control signals from a transmitter of the mobile device and launch or detonate the fireworks according to the user-customized show or display. The application also may provide at least one simulated display or show, such as a graphical display or video, that allows the user to view their predefined custom show or display on the mobile device prior to the actual ignition or detonation of the fireworks according to the user defined custom show or display. The application also can determine a position or location of the mobile device in relation to the firing module or fireworks attached thereto, and may provide a warning to the user that the user is too close to the firing device or is too far from or out of range from the firing module. The application also may prevent the user from initiating the custom display or show until the mobile device is at a predetermined distance or proximity, or within a predefined zone, in relation to the firing module or firework(s) attached thereto. The selectable icons or areas on the display, and/or mechanical buttons of the mobile device, also can be activated or selected to manually fire one or more fireworks. A user also may be provided a warning or firing may be prevented if the mobile device is not outside of, or within, a prescribed zone, proximity, or distance with respect to the firing module or fireworks in communication therewith.

In yet another aspect, this disclosure is directed to a method for ignition or detonation of fireworks or other pyrotechnic devices. For example, the method may include providing one or more fireworks and a corresponding detonator for each of one or more fireworks, which detonator may be part of a firing module. The method further may include requesting user authentication information, and upon user input of the user authentication information into a mobile device, determining whether inputted user authentication information is associated with one or more control device profiles. The method further may include displaying the control device profiles associated with the user authentication information, and receiving a selected control device profile among the displayed control device profiles. The method also can include establishing a connection between the mobile device and a firing module associated with the selected control device profile. The method additionally can include displaying a control screen with selectable areas so that a user can select the areas to generate a user customized fireworks display or show, and transmitting one or more control signals from the mobile device to the firing module to ignite or detonate the fireworks attached thereto according to the user designed/customized fireworks display or show. The method can include presenting or displaying a simulation, such as a graphic, animation or video, of the user customized firework display or show. The method may include determining a location of the mobile device in relation to the firework(s) or detonator, and upon determining that the mobile device is outside of a specific proximity, distance or zone, providing a warning or notification to the user that they are too close to or too far from the firing device.

In an even further aspect, this disclosure provides a mobile application, software, instructions, or workflows for mobile control of detonation or launching of one or more fireworks. The mobile application may be stored on a non-transitory computer readable medium of a mobile device, or a storage or memory of a server in communication with a network accessed by the mobile device. The mobile application may show control display screens on the mobile device with one or more selectable areas that a user can select to create a user customized fireworks display or show. For example, the control screen of the mobile application can include an area the shows a graphic providing information of a song or other audio to be played and a selectable list of fireworks or pyrotechnic devices, and a user can select a specific firework from the selectable list and a location along the graphic showing information of the song so the firework is detonated to generally correspond to a desired aspect of the song or other audio. Upon selection of different fireworks on the list and locations or areas along the graphic indicative of song information, the user can define or create a user customizable display or show for igniting or launching the fireworks in a timed manner to generally correspond to aspects of the song or other audio. The mobile application can also cause or control a transmitter of the mobile device running or accessing the mobile application to transmit one or more control signals that can be received by a receiver in communication with one or more detonators that launch or ignite fireworks connected thereto in accordance with the user defined or create display or show.

BRIEF DESCRIPTION OF THE DRAWINGS

The accompanying drawings, which are included to provide a further understanding of the embodiments of the present disclosure, are incorporated in and constitute a part of this specification, illustrate embodiments of the invention, and together with the detailed description, serve to explain the principles of the embodiments discussed herein. No attempt is made to show structural details of this disclosure in more detail than may be necessary for a fundamental understanding of the exemplary embodiments discussed herein and the various ways in which they may be practiced.

Those skilled in the art will appreciate and understand that, according to common practice, the various features of the drawings discussed below are not necessarily drawn to scale, and that the dimensions of various features and elements of the drawings may be expanded or reduced to more clearly illustrate the embodiments of the present invention as described herein.

DETAILED DESCRIPTION

Figure 1:
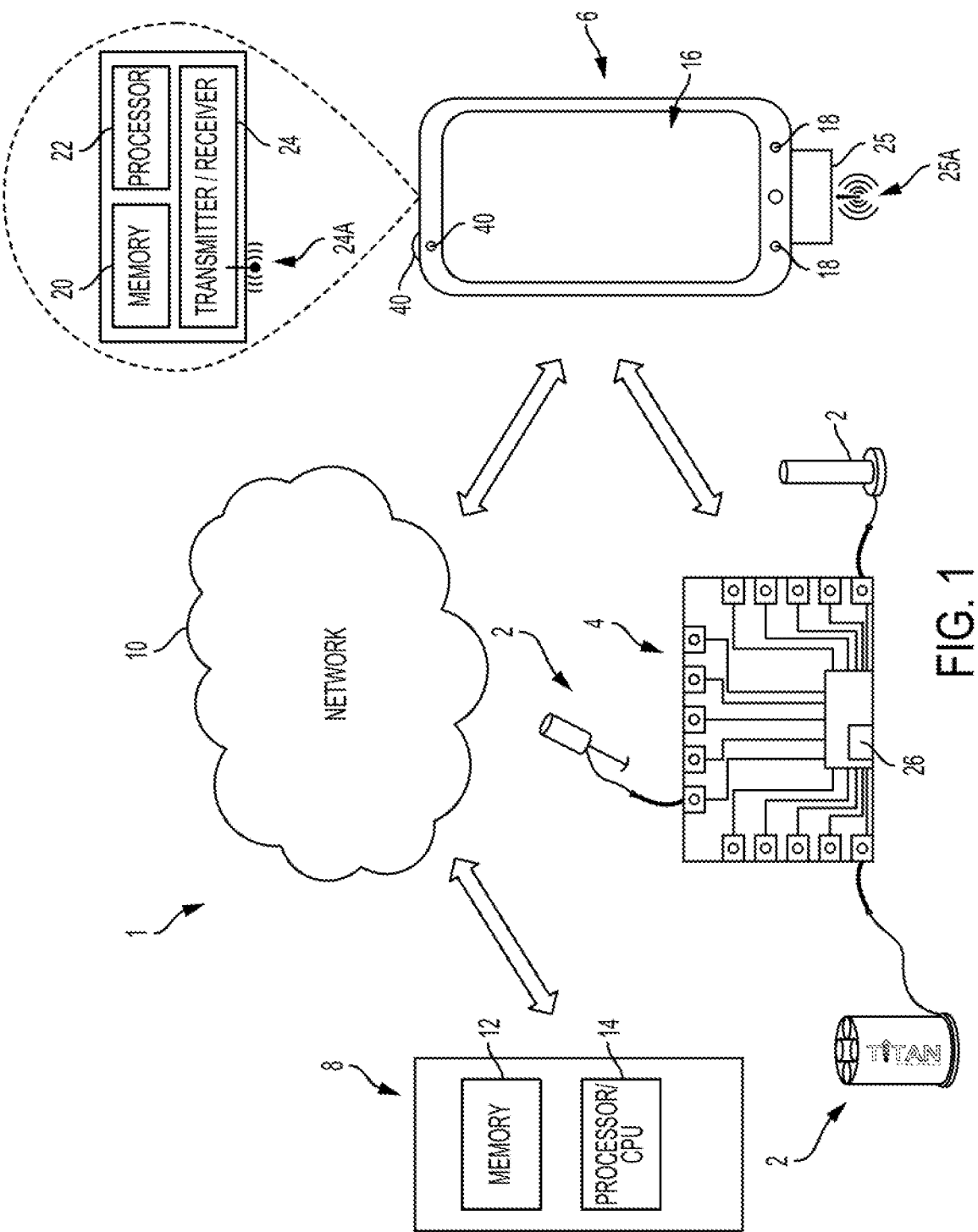
FIG. 1 shows a firework or pyrotechnic kit or system according to principles of the present disclosure.

As generally shown in FIGS. 1-7F, the present disclosure is, in one aspect, directed to a fireworks kit or fireworks detonation system 1 that includes one or more fireworks or other pyrotechnics 2, one or more firing modules or detonation systems 4 operable to ignite, activate, or otherwise detonate the fireworks/pyrotechnics 2, a remote controller or mobile device 6, and a server 8. The remote controller or mobile device 6 is in communication with the firing module 4 and is operable to provide dynamic and/or customizable control of detonation, ignition, or activation of the firework(s) 2. The device 6 is operable to provide a user defined, customized display or show of the fireworks 2 according to a dynamic sequence or pattern, such as a square or pattern that generally corresponds with one or more aspects of a song, melody, or other suitable audio. The fireworks or pyrotechnic devices 2 can be any ignitable firework or pyrotechnic, and can include, for example, single-shot aerial tubes; multi-shot aerial tubes or cakes; reloadable launching tubes; bottle rockets; missiles; sky rockets; spinners; flares; fountains; roman candles; smoke bombs or other smoke devices; M-80s, M-1000s, Cherry bombs or other firecrackers/noisemakers; sparkers; wheels; strobes; snakes; or mines. It will be further understood that any suitable firework or pyrotechnic other than those listed can be used without departing from the present disclosure. The server 8 can be in communication with the remote controller or mobile device 6, typically through a network 10 to provide the mobile device 6 access to information related to the firework(s) 2 or pre-saved or manufacturer defined shows, sequences, or patterns for detonation or ignition thereof (FIG. 1). The network 10 may include the internet or another wide area network, a local area network, or a combination thereof. The server 8 also may include a memory 12 that stores the information related to the fireworks or the pre-saved/manufacture shows or displays, as well as a processor 14 operable to access the information stored in the memory 12, and upon request, send or transmit the information to the mobile device 6 via the network 10. The processor 14 can include a central processing unit (CPU), a graphics processing unit (GPU), or combinations thereof. The memory 12 can include a main memory and a static memory that can communicate with each other via a bus. The static memory may include any suitable computer-readable medium in which one or more sets of instructions such as software can be embedded, while the static memory also may contain space for data storage.

FIG. 1 shows that the remote control or mobile device 6, such as a phone, tablet, personal data assistant, voice assistant, or other suitable or similar device, may include a display 16 and one or more inputs 18. The display 16 could also be interactive to provide touch screen input capability, for example, while the mobile device 6 typically is provided by the user, the mobile device or remote controller 6 can be provided as a part of the fireworks kit or package our could be a mobile application or program operable on the device 6. The inputs may be overlaid or superimposed onto the display 16, so the display 16 is selectable, e.g., a touchscreen or other suitable selectable display, allowing a user to select one or more areas, icons, and/or images on the display to provide user defined, customizable, and/or dynamic mobile/remote control of detonation, ignition, or activation of the one or more fireworks 2 in communication with the remote control/mobile device 6. The inputs 18 may include one or more mechanical buttons, tabs, levers, or keyboards that are selectable, movable, or otherwise operable by the user to facilitate for remote/mobile control of ignition or detonation of the fireworks(s) 2. The mobile device or remote control 6 also includes a storage or memory 20 a processor 22, and a receiver/transmitter 24. The memory can include a random access memory (RAM), read only memory (ROM), or other non-transitory computer readable medium. It further will be understood that the processor 22 can include a central processing unit (CPU), a graphics processing unit (GPU), or both, and the memory 20 can include a main memory and a static memory that can communicate with each other via a bus. The static memory may include any suitable computer-readable medium in which one or more sets of instructions such as software can be embedded, while the static memory also may contain space for data storage. The receiver transmitter also can include one or more antennas 24A. An external transmitter or receiver 25, however, optionally can be coupled to, and in communication with, the mobile device 6, without departing from the present disclosure. For example, the external device 25 can include a removable transmitter or receiver including an antenna(s) 25A. The external transmitter/receiver 25 can be configured to modulate, alter, or modify a transmitted signal(s) so the transmitted signals can only be understood or otherwise received by the receiver 26 of the firing module 4.

The processor 22 of the mobile device can access and execute an application or program stored in the memory 20 of the mobile device, or stored in the memory 12 of the server 8 through the network 10, which application can cause the display 16 or show one or more control screens thereon that can have one or more areas or icons that are selectable to provide for customizable/dynamic control of the ignition or detonation of the firework(s), e.g., a custom show or display of the firework(s) where the fireworks are detonated or ignited according to a predefine pattern or sequence and/or in a timed manner so as to correspond to selected parts of a song, as generally shown in FIGS. 7A-7F. Upon selection of one or more icons or areas, and/or mechanical inputs, the application may define or create a user customized show or sequence for ignition of the firework(s) and generate one or more control signals to be received by a receiver 24, in communication with the firing module 4 connected to the firework(s) 2, and upon receipt of these control signals, the firing module 4 may ignite, detonate or otherwise activate the firework(s) 2 to initiate the user defined, custom fireworks show, sequence, or display. The control signals may include Bluetooth® transmission signals; however, embodiments of this disclosure are not limited thereto and the control signals may include other radio (RF) waves, infrared (IR), or other suitable transmissions, without departing from this disclosure.

Figure 2:
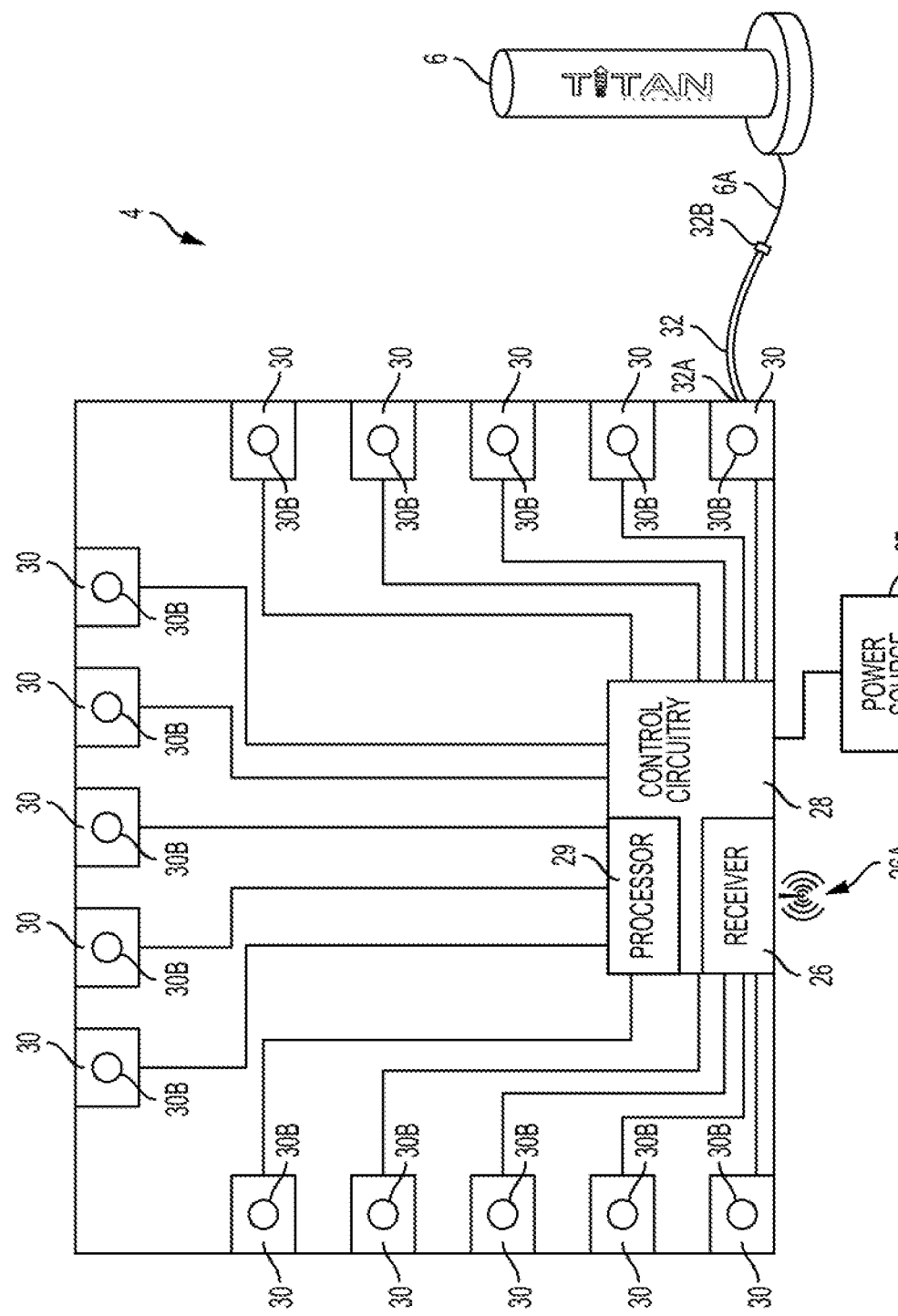
FIG. 2 shows a schematic diagram of a firing module or detonation control system according to principles of the present disclosure.

As shown in FIG. 2, the firing module or detonation system 4 will generally comprise a controller or control circuitry 28 that includes, or is in communication with, a processor or CPU 29 that controls one or more detonators or detonation modules 30 to ignite, activate, or detonate one or more firework(s) 2 or other pyrotechnic devices that are connected to the detonators 30. The control circuitry 28 further includes, or is in communication with, a receiver 26 that may have one or more antennas 26A configured to receive the control signals transmitted from the mobile device 6. Upon receipt of one or more of the control signals from the mobile device 6, the control circuitry 28 may instruct or otherwise control the detonators 30 to detonate the firework(s) 2. Each detonator 30 also may be in communication with at least one light source 30B, such as an LED or other suitable light source, that may light up or illuminate to indicate that a firework or other pyrotechnic 2 is properly attached to a corresponding detonator 30. For example, the light sources 30B of the detonators 30 may be illuminated to a specified color, e.g., green or other suitable color, when a firework 2 is correctly coupled to, or otherwise in communication with, the detonator 30. The light sources 30B also may light up a different color, e.g., red or other suitable color, after the firework connected to the detonator 30 has been launched or ignited, or could emit an audible sound or other notification itself or on the mobile device 6 when the firework is correctly coupled or when the mobile device is a requisite distance from the system 4 or firework(s), e.g. in preparation for launch. In addition, the firing module 4 can have a test or simulation mode in which the light sources 30B can illuminate in a predetermined sequence or timed manner corresponding to the defined show/display, to simulate the sequence, pattern, or manner in which the fireworks will be ignited, launched, or detonated.

Figure 3A:
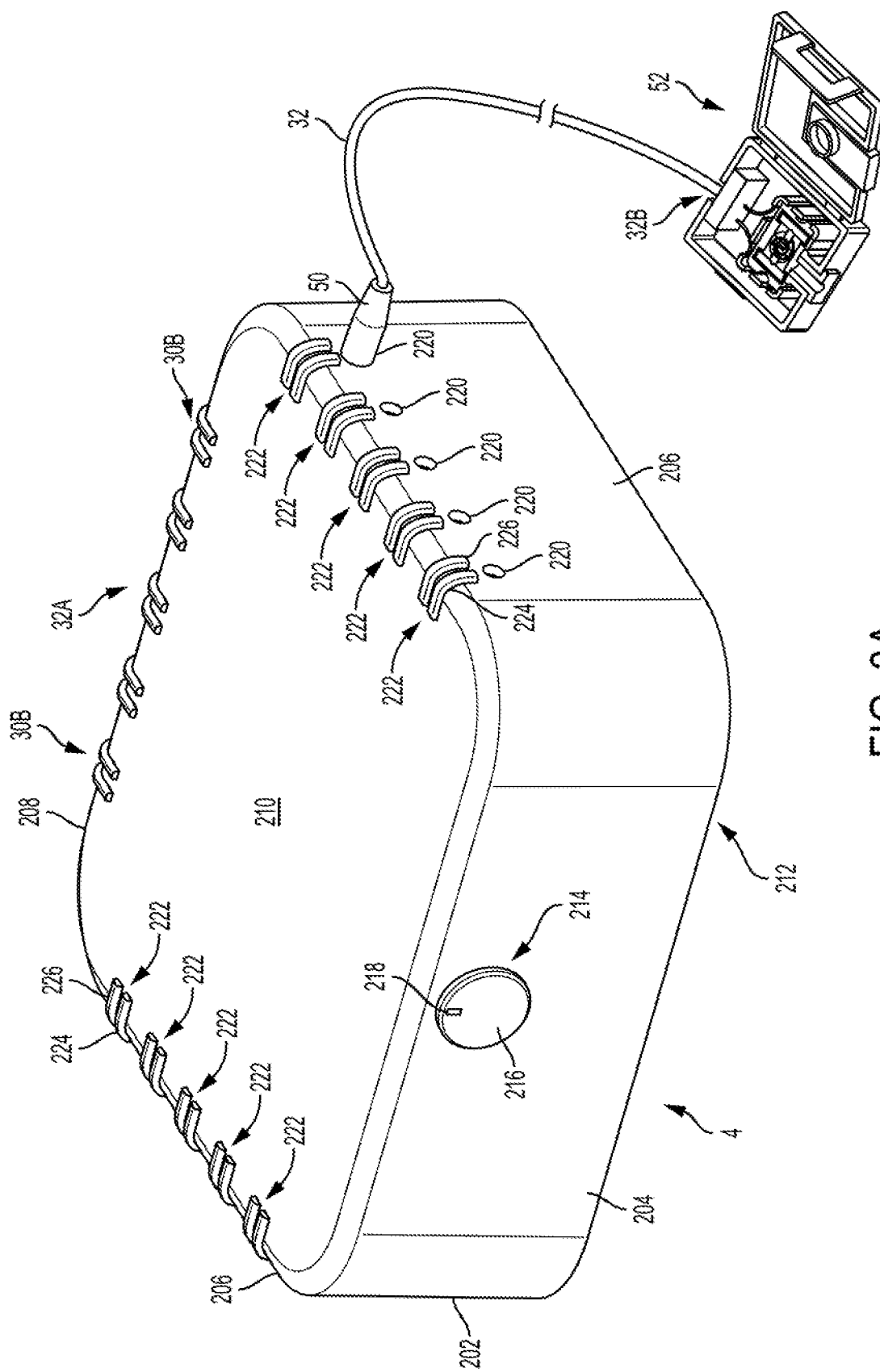
FIGS. 3A and 3B show top and bottom perspective views, respectively, of a firing module or detonation control system according to principles of this disclosure.
Figure 3B:
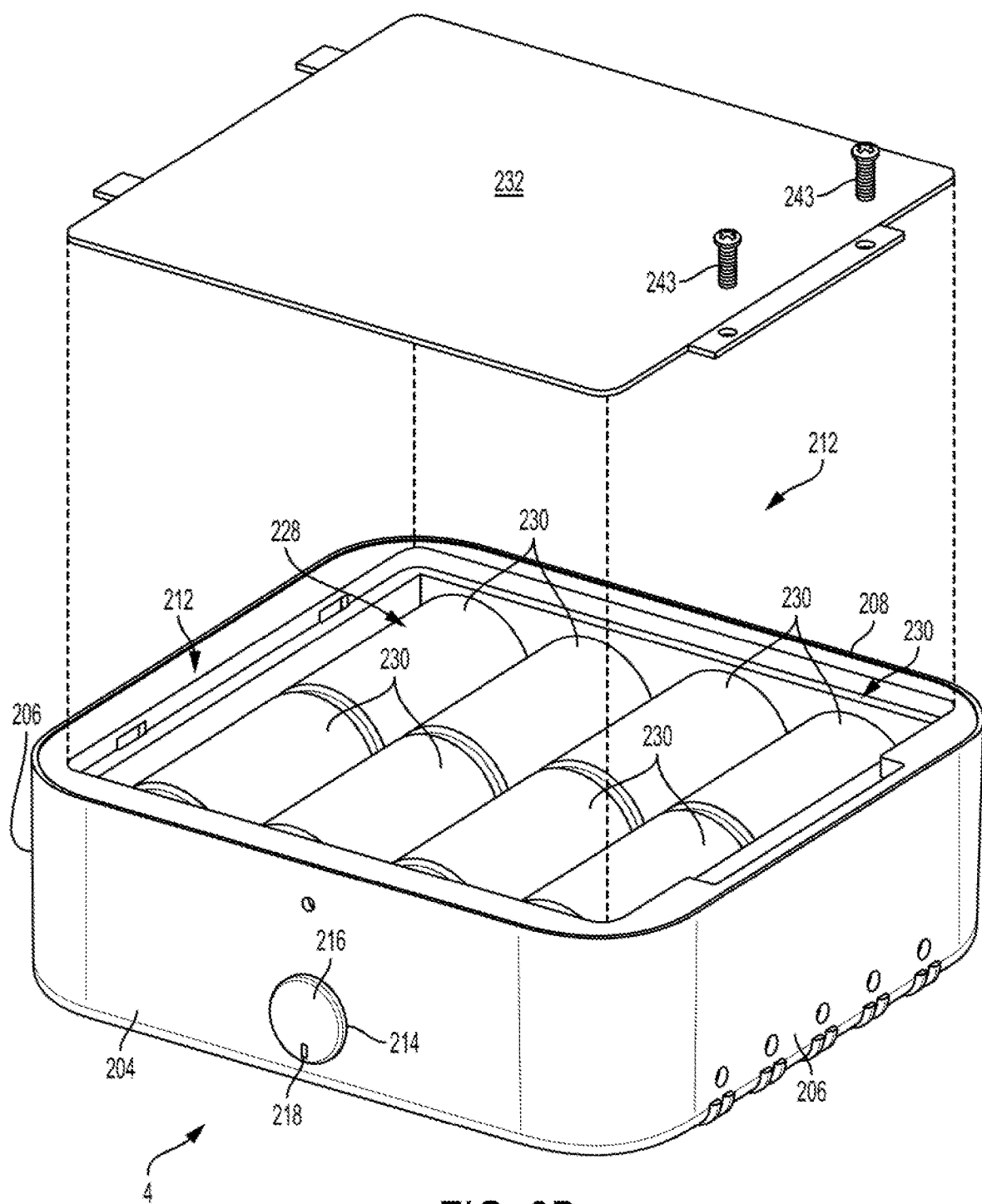

As generally shown in FIGS. 3A and 3B, the firing module/detonation system 4 further can include a housing 202 having a front 204, side 206, rear 208, top 210, and bottom 212 portions or sections. The housing 202 may at least partially receive the control circuitry 28 and the one or more detonator models 30 shown in FIG. 2. The sections/portions of the housing 202 generally comprise a generally square or rectangular shape, though the housing and sections/portions of the housing can include any suitable shape without departing from the present disclosure. For example, the housing can be constructed to include octahedrons, pyramids, prisms, spheres, hemispheres, cubes, cuboids, cones, tetrahedrons, cylinder, dodecahedrons, and/or combinations thereof, or other suitable shapes, constructions, or configurations. The front portion 204 of the housing includes an activation portion 214, for example, a button 216 or other suitable selectable member, that can be actuated or otherwise engaged to turn on/off or otherwise initiate the firing device/detonation system 4. The activation portion 214 further can facilitate connection of the firing device/detonation system 4 to the mobile device 6. In one example embodiment, a user can press or otherwise engage the activation portion 214 for a specific time interval to initiate a wireless connection, such as, Bluetooth® or other suitable wireless connection, with the mobile device 6. The button 216 can have a generally round shape, though other suitable shapes such as square, rectangular, polygonal shapes, or other suitable shapes can be used without departing from the present disclosure. The button 214 also can include one or more indicators 218, such an LED or other light source, disposed therealong. The indicator(s) 218 can illuminate or emit a sound or other notification when the firing module/ detonation system 4 is powered on/off, is in a stand-by mode, or when a connection is established or lost between the firing module/detonation system and the mobile device.

FIGS. 3A and 3B further show that the side 206 and rear 208 portions of the housing 202 include a series of ports or holes 220 sized, dimensioned, and/or configured to receive or otherwise accept at least a portion, e.g., a connection portion 50, of one or more detonation wires 32, as generally shown in FIG. 3A. The side/rear portion 206/208 can each include five ports that are each aligned or otherwise in communication with a corresponding detonator or ignition modules 30 to enable/facilitate connection or coupling of the detonation wires 32 and detonation or ignition modules 30. The present disclosure is not limited to this construction, however, and each section/portion (204, 206, 208, 210) of the firing device/detonation system can include any suitable number of detonation/ignition modules and corresponding ports, such as one, two, three, four, six, or greater than six ports, such as up to 10 ports, without departing from the present disclosure. The top 210 and/or side 206 portions further can include a plurality of indicators 222 disposed therealong. The indicators 222 can include one or more LEDS or other suitable light sources or indicators. For example, the plurality of indicators 222 can include pairs of indicators 224/226 disposed substantially adjacent or substantially proximate to a corresponding port 220 of the plurality of ports. The pairs of indicators 224/226 may light up, flash, or otherwise illuminate when a detonation wire 32 is connected, disconnected, armed or otherwise activated. In one embodiment, one or both of the indicators of the pair of indicators 224/226 may light up a specific color, or flash according to a specific sequence, when a detonation wire is successfully connected to a corresponding detonator 30. Also, one or both of the indicators of the pair of indicators 224/226 may light up a different color, or flash according to a different, distinct sequence, if a detonation wire is not properly connected to, loosed from, or otherwise disconnected from a corresponding detonator 30. The pairs of indicators 224/226 further can be activated to facilitate training or testing or a simulation mode of the firing module/ detonation system.

The bottom portion 212 of the housing 202 can include a cavity or chamber 228 configured to receive one or more batteries 230 (FIG. 3B), which batteries may be the power source 27 of the firing module/detonation system. The batteries can include a plurality of D batteries; however, any type or number of batteries, such as A, AA, AAA, C, 9-Volt batteries, other suitable alkaline or lithium batteries, and/or other power storage mechanisms, for example a battery pack, rechargeable batteries, or AC or DC electrical connection, can be used without departing form the present disclosure. The bottom portion 212 further can include a cover or other suitable portion 232 that can at least partially cover an opening or aperture 230A of the cavity 228. The cover 232 can be removably coupled to the bottom portion 212, such as by one or more fasteners, for example, screws 243, bolts, or other suitable fastening mechanisms, to facilitate loading and unloading of the one or more batteries to and from the chamber, or otherwise provide access to the components of the firing module. The cover 232, however, can be otherwise connected to the bottom portion 212, such as by a snap fitting, frictional fit, or other coupling mechanism, without departing from the present disclosure.

Figure 4:
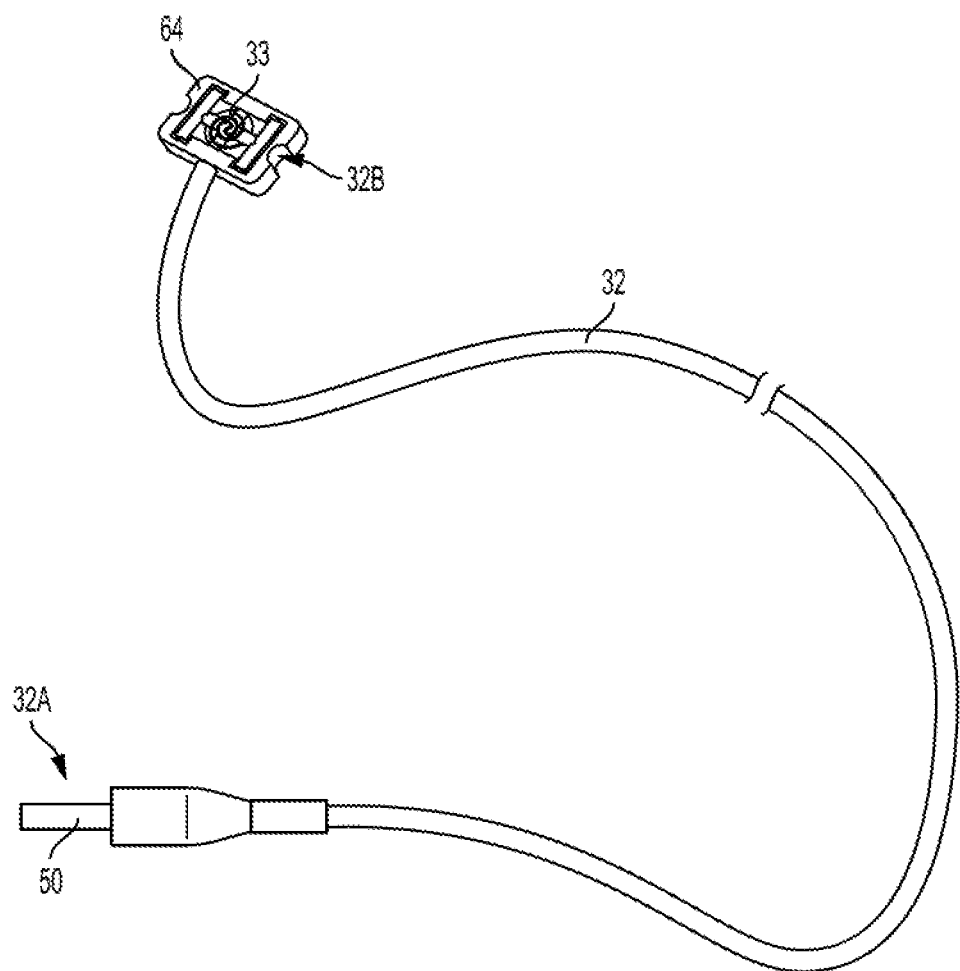
FIG. 4 shows an example fuse detonation wire for use with the firing device/detonation control system according to principles of the present disclosure.

As generally shown in FIG. 4, the detonation wires 32 may include a connector or connection mechanism 50, such as a male connector, that is configured to be received within a connector 30A of the detonators 30, such as a female connector, and the detonation wires 32 also may include a heating element 64, for example, a resistive heating element comprising a coiled wire 33, that can be heated to a predefined temperature sufficient to ignite or light a fuse 6A of the firework(s) 2. FIGS. 5A-D show that the detonation wires 32 further can include a fuse connection assembly 52. As shown in FIGS. 5A-D, the detonation wire 32 generally includes the connection portion or mechanism 50 at the first end 32A of the wire 32 for connecting the wire 32 to a port or other suitable connector of the detonator 30. The detonation wire 32 further includes the fuse connection assembly or system 52 at a second end 32B thereof to facilitate a substantially secure connection to a fuse, e.g., 6A, or other ignition mechanism of the firework or fireworks. The connection assembly 52 comprises a case, housing or other suitable body 54 with front 55, rear 56, side 57/58, top 59, and bottom 60 portions that at least partially extend about and at least partially define a chamber or cavity 62. The sections/portions of the case can comprise a generally square or rectangular shape, though the case and sections/portions of the case can include any suitable shape or shapes; for example, the case can be constructed to include octahedrons, pyramids, prisms, spheres, hemispheres, cubes, cuboids, cones, tetrahedrons, cylinder, dodecahedrons, and/or combinations thereof, or other suitable shapes, constructions, and/or configurations, without departing from the present disclosure. The cavity/chamber 62 generally is sized, dimensioned, and/or otherwise configured to at least partially receive a heating element 64, which can include a resistive heating element 64, for example, a heating element that comprises a coiled wire that can be heated to ignite the fuse 6A of a firework and/or any other suitable heating element or mechanism sufficient for igniting or activating a fuse or other ignition element of fireworks or other pyrotechnic devices. The chamber or cavity 62 can also have one or more openings or apertures 66 providing access thereto, as well as the heating element 64 or other components housed within the chamber/cavity.

Figure 5A:
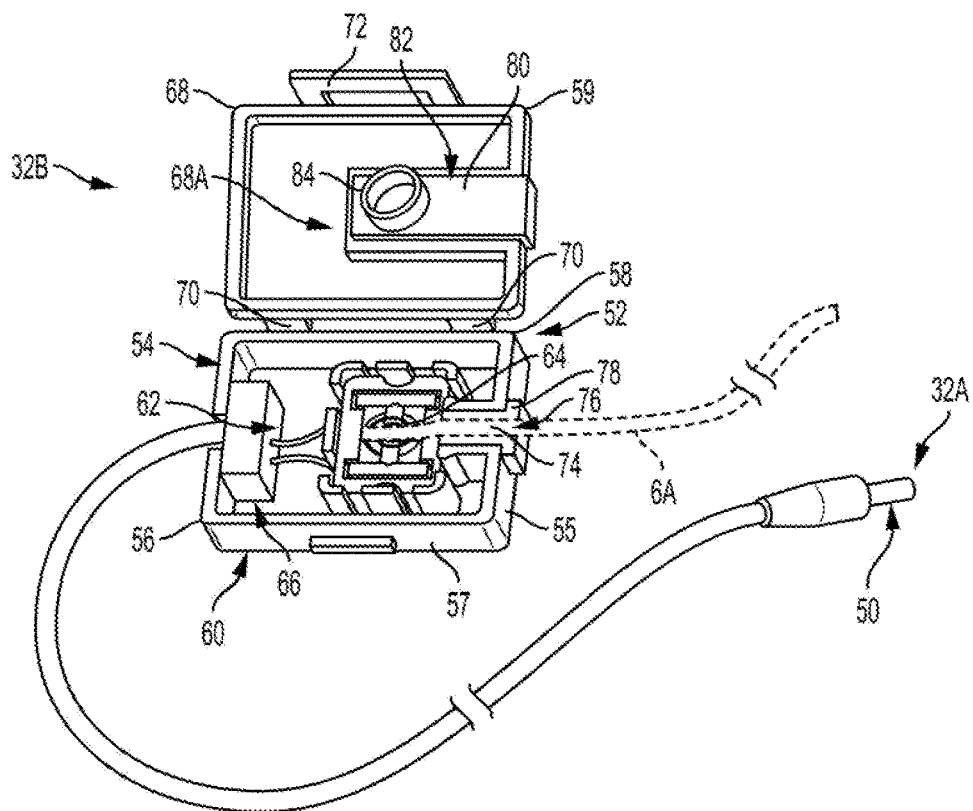
FIGS. 5A-5D show a detonation wire having a fuse connection assembly at an end thereof according to one aspect of the present disclosure.
Figure 5B:
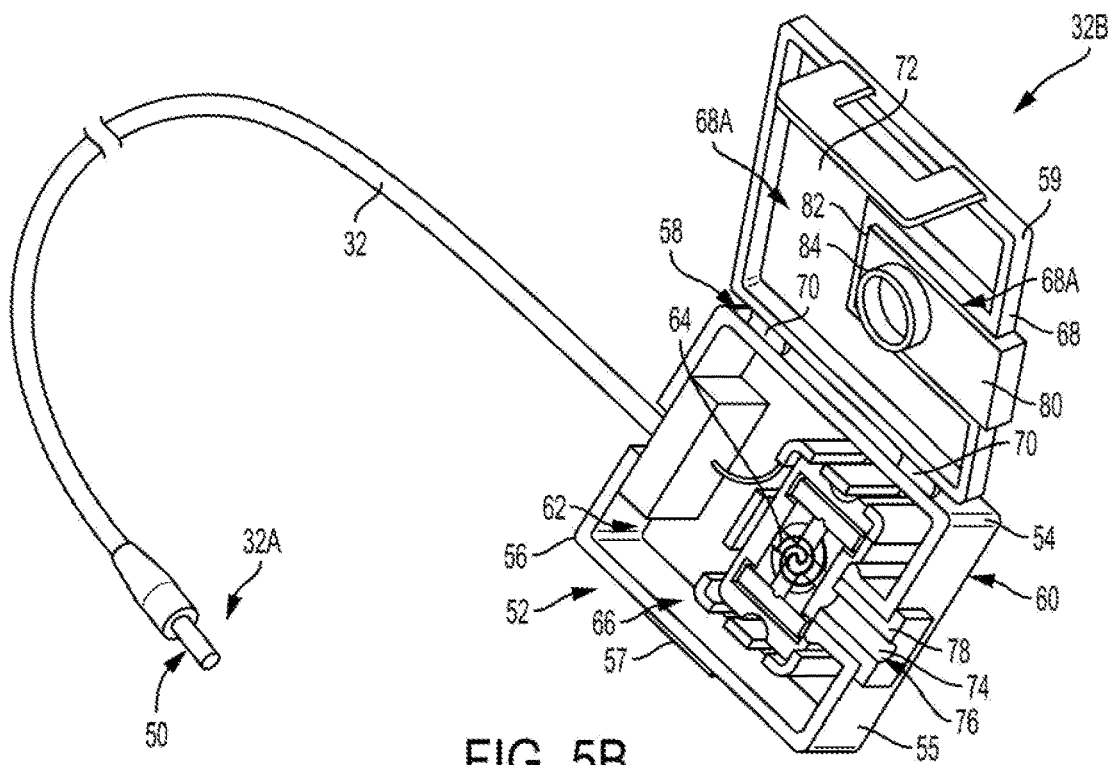
Figure 5C:
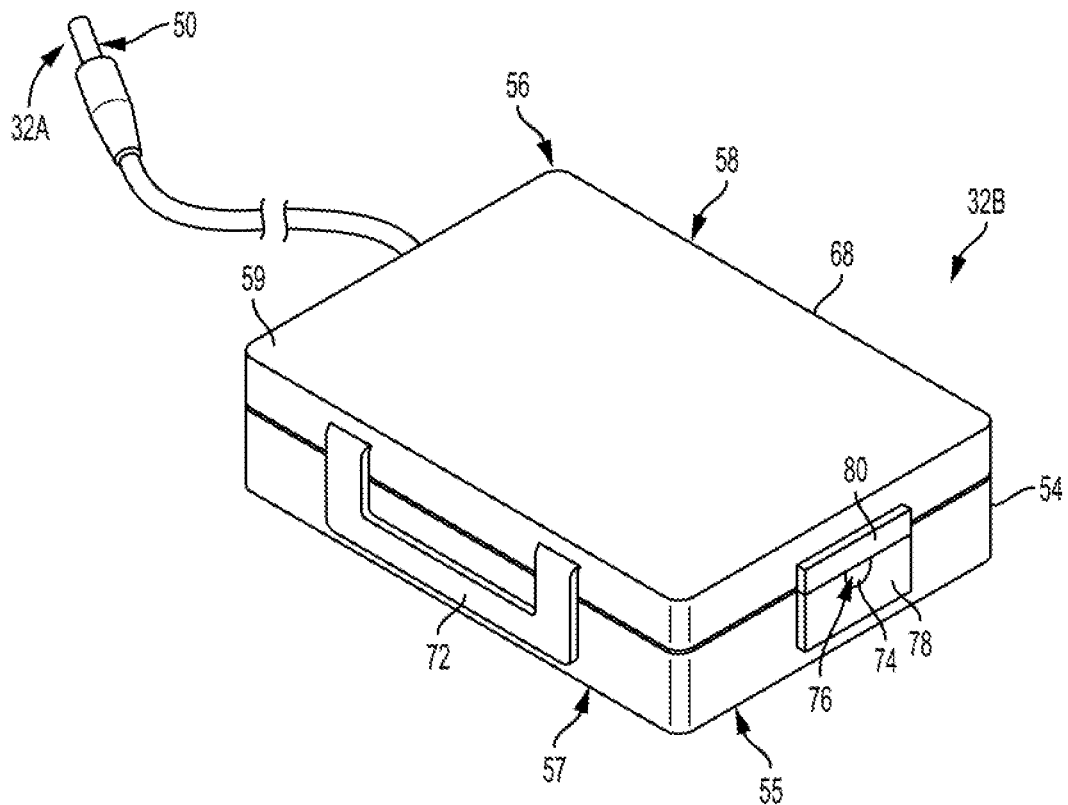
Figure 5D:
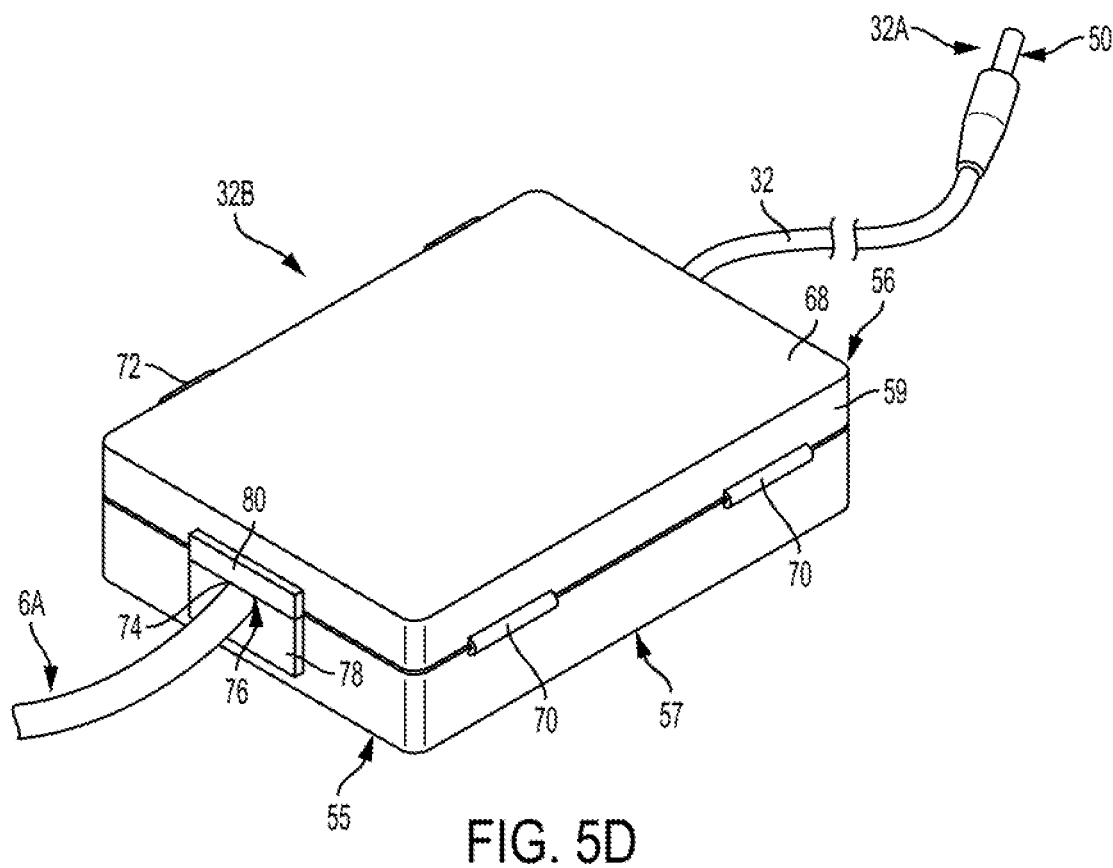

The top portion 59 of the connection assembly 52 further may comprise a lid or cover 68 that is movable to at least partially cover and uncover the aperture(s) 66, as generally shown in FIGS. 5C and 5D. In one example, as shown in FIGS. 5C and 5D, the cover 68 can be pivotably connected/ coupled to the housing 54, for example, by one or more hinges 70 or other suitable mechanisms, such that the cover 68 is pivotable or otherwise movable between an open position (FIGS. 3C and 3D) allowing access to the chamber 62 and a closed position (FIGS. 3E and 3F) substantially sealing or otherwise closing off the chamber 62. With the cover 68 in the closed position, the fuse may be engaged between the cover 68 and the bottom 60 or side portion 57/58. Additionally, a plurality of hinges 70 can be arranged along one of the side portions 57/58 of the housing 54 to connect the cover 68 thereto, and though two hinges 70 are shown, any number of hinges, such as one three, four or five hinges, can be used without departing from the present disclosure. As shown in FIGS. 5A-C, the cover 68 further can include a latch, clasp or other suitable locking mechanism 72 for securing or locking the cover 68 in the closed position. The cover 68 also can be biased, for example, by one or more biasing members, e.g., springs or other suitable biasing mechanisms, that urge or force the cover 68/top portion 59 towards the closed position. In one example embodiment, one or more of the hinges 70 can include a torsion spring or other suitable biasing mechanism attached thereto for biasing or urging the cover towards the closed position. As a result, the cover 68/top portion 59 can be urged or otherwise moved toward an open position, such that a fuse 6A can be aligned with the ignition/heating element, and the cover 68/top portion 59 can be released to engage the fuse between the cover/top portion and the ignition element. The cover further can be removable or detachable from the housing without departing from the present disclosure, for example the cover can be snap fitted to the housing and completely detachable/removable therefrom.

The front portion 55 of the housing 54 can include a groove or channel 74 with an opening 76 positioned therealong that is generally sized, dimensioned, and/or otherwise configured to at least partially receive a fuse 6A of a firework or pyrotechnic (FIG. 5D). The groove or channel 74 can be at least partially positioned in alignment with the heating element 64, and for example, a fuse 6A of the firework can be at least partially received or positioned within the channel/groove 74 to least partially align the fuse about the heating element with at least a portion of the fuse contacting or otherwise engaging the heating element to facilitate ignition thereof. Additionally, with the fuse positioned/received within the channel 74, the cover 68 can be closed to pinch or otherwise engage the fuse between the cover/top portion and one or more surfaces/portions of the channel to substantially secure or hold the fuse into contact or other suitable engagement with the heating element 64. With this construction, for example, if an operator adjusts or moves the firework, detonator, and/or wire, or if the pyrotechnic is accidentally displaced, e.g., bumped or knocked over, the engagement of the fuse between the cover 68 and the surface(s) of the channel 74, or other portion of the body 54, may maintain sufficient contact or engagement between the fuse and heating element so as, for example, to ensure/facilitate substantially consistent and/or reliable ignition or activation of the corresponding firework/pyrotechnic.

FIGS. 5C and D show that the groove/channel 74 further can comprise an elastic material 78 positioned at least partially along or at least partially within the groove 74. In addition, the cover 68 can also include an elastic material 80 arranged along a bottom surface/portion 68A thereof and positioned to at least partially engage the fuse with the cover 68 in the closed position. The elastic materials can include silicone or other suitable heat resistant, elastic materials, for example, rubber, polymeric materials, etc. The elastic materials further may ensure sufficient engagement of the fuse between the cover 68 and portions of the channel 74 without damage thereto, and further may substantially insulate or protect the housing and components thereof from heat, sparks, etc., e.g. which could be generated by the ignited fuse, firework, or otherwise. In one embodiment, as further shown in FIGS. 5C and 5D, the elastic material 80 arranged along the bottom surface 68A of the cover can include a body 82 having a substantially rectangular shape, though other shapes are possible, for example, square, polygonal, circular, and/or oval shapes, without departing from the present disclosure. The body 82 further may include an engaging or projecting portion 84 configured to be at least partially aligned with the heating element 64 when the cover is in the closed position, which engaging/projecting portion 84 may have a substantially cylindrical shape sized, configured, and/or dimensioned to at least partially surround the heating element with the cover in the closed position, though other shapes, such as square, oval, or polygonal shapes are possible without departing from the present disclosure. The engaging/projecting proportion 64 may at least partially engage or press the fuse 6A into engagement with the heating element when the cover is in the closed position to facilitate substantially reliable ignition thereof, for example, to ensure or facilitate sufficient contact or other engagement between the fuse and heating element.

The processor 22 of the mobile device 6, may access an application, e.g., a mobile application 100, software program, instructions, workflows or other computer readable instructions, stored in the memory 20 of the mobile device 6, or alternatively in the storage or memory 12 of server 8 through or in communication with the mobile device 6. The application 100 can be operable or executable to show or display one or more control screens on the display 16 of the mobile device 6 to provide dynamic or customizable control of the ignition or detonation of one or more of the fireworks 2, e.g., using a firing module 4 in communication with the mobile device 6. For example, the application can be downloaded from an online marketplace, e.g., the Apple® App Store, Samsung's® App Store, Google Play® or other suitable online marketplace and stored in the memory 20 of the mobile device 6, or in the alternative, may be stored in the storage or memory 22 of server 8 and accessed by the mobile device 6, e.g., through a website, virtual network, cloud based network or other suitable means. The processor 22 of the mobile device 6 may access and execute the mobile application. The various components or parts of the mobile application, however, may be carried out or executed by the processor 14 of the server 8, or a processor of the control circuitry 28 of the firing device 4, or any suitable combination of the mobile device 6, detonation system 4, server 8, or other location without departing from this disclosure.

Figure 6:
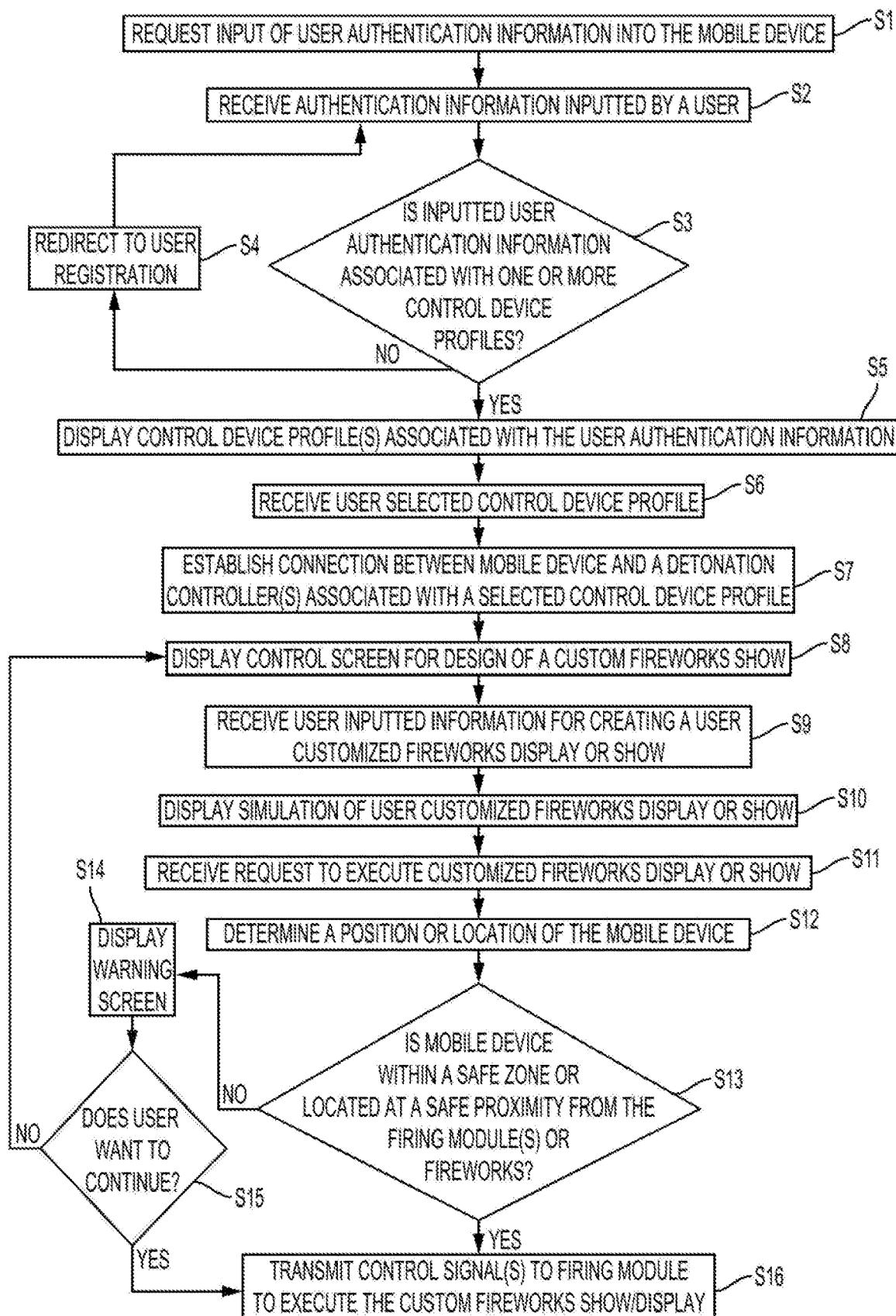
FIG. 6 shows a flow chart for a process of automated detonation of fireworks using a mobile device according to principles of the present disclosure.

FIG. 6 shows a flow chart for a process or workflow of the mobile application 100 according to one example embodiment. As shown in FIG. 6, upon activation or opening of the application 100 on the mobile device 6, the mobile application 100 may initially request user authentication information (block S1). For example, the mobile application 100 may notify or request that, e.g., through the display 16 on the mobile device 6, audio played by the mobile device 6, or other suitable notification(s), the user input user authentication information, such as a user name, identification code, and/or Facebook® or Google® account or other suitable identifier, in order to open or otherwise access the mobile application 100.

The mobile application 100 receives the authentication information entered by the user at block S2 in FIG. 6, and determines if the authentication information has been previously registered, and/or if the authentication information is associated with one or more control device profiles associated with a particular firing module 4 at block S3. If the mobile application 100 does not recognize the entered authentication information, the mobile application 100 may direct the user to a user registration (block S4). The mobile application 100 additionally may notify the user, e.g., via a display screen or other suitable notification, that user authentication information is not recognized and/or the user is not registered, and further may request that the user register, e.g., using the user's email address. To register, a user may be sent an activation email to an email address entered by the user. The activation email may direct the user to set up or activate user authentication information. In one embodiment, after a user initially registers the user authentication information, the mobile application 100 may not request authentication information upon subsequent openings of the mobile application; however, the mobile application 100 may request user authentication information each time the mobile application 100 is opened or accessed, without departing from the present disclosure.

FIG. 6 further shows that if/when the entered user authentication information is recognized or otherwise accepted, e.g., determined to be associated with one or more control device profiles associate with a firing device or module 4 at block S3, the mobile application may display one or more control device or firing module profiles associated with the user authentication information at block S5. Upon selection of a user's selected/desired device profile of the displayed device profiles, the mobile application 100 may receive the selected device profile (block S6) and establish a connection between the mobile device 6, e.g., with transmitter/receiver 24, and a firing module 4, e.g., with receiver 26, associated with the selected control device profile (block S7). In one embodiment, the mobile application 100 can require a user to enter a password associated with a selected control device profile before initiating a connection with the selected control device, e.g., a firing module. In one embodiment, the mobile application 100 can establish a Bluetooth connection between the mobile device 6 and the firing module or detonator 4. Other connections are possible, however, and the transmitter 24 of the mobile device 6, or an external, detachable transmitter 25 coupled to the mobile device 6, can communicate with the receiver 26 of the firing device 4 or detonator using any other suitable radio transmissions (RF), infrared (IR), or other suitable transmissions or waves without departing from the present disclosure. In addition, the transmissions of the mobile device 6 optionally can be altered, modulated, or otherwise modified such that the transmissions can only be received or understood by the receiver 26 of the connected firing module. A secure connection may prevent ambient transmissions from inadvertently activating the firing device or detonators and may also offer protection from a third party takeovers of the firing device or detonator.

Referring again to FIG. 6, when a connection between the mobile device and the firing module associated with the selected control device profile has been established (block S7), the mobile application 100 can display a firing device control screen as shown at block S8. The firing module control screen can enable or facilitate user creation of dynamic or customizable fireworks shows or displays, for example, where the selected firing module detonates or activates the fireworks/pyrotechnic connected thereto according to a predefined sequence or pattern. For example, the firing module control screen can allow for the creation of one or more user defined fireworks shows in which a plurality of fireworks are detonated/activated according to a specific sequence or pattern that generally corresponds to one or more aspects of a selected song or other suitable audio. The firing device control screen also can enable a user to manually fire one or more fireworks or pyrotechnics in communication with the connected/selected firing module. When the user creates or defines the customized fireworks show or display, the mobile application 100 may receive information related to the user customized display (block S9) and provide a simulation of the customized fireworks display or show (block S10). In one example embodiment, the simulation can include playing the selected song or audio and illuminating light sources, such as light sources 30B, 222, in communication with each of the detonators of the selected/connected firing module according to the pattern or sequence that generally corresponds to the defined pattern or sequence for detonation/activation of the plurality of fireworks.

When the mobile application 100 receives the user's request to execute the customized show (block S11), or receives a request for manual detonation, the mobile application 100 may determine a position or location of the mobile device 6 (at block S12 in FIG. 6). For example, the mobile application 100 may detect or determine a signal strength between the mobile device 6 and the firing module, or access a GPS system of the mobile device, to determine whether the mobile device 6 is within, or outside of, a predetermined proximity, distance, or zone with respect to the firing module 4 (block S13). If the user is not within a safe zone or at a safe proximity from the firing module or one or more fireworks connected thereto, the mobile device may display a warning screen (block S14) and provide a request to determine if the user would like to continue (block S15). Additionally, if/when the user is within a safe zone or safe proximity/distance from the firing module and fireworks connected thereto, the mobile application may cause the mobile device, or transmitter attached thereto, to transmit one or more control signals to the connected firing module to perform/execute the custom fireworks show/display.

Figure 7A:
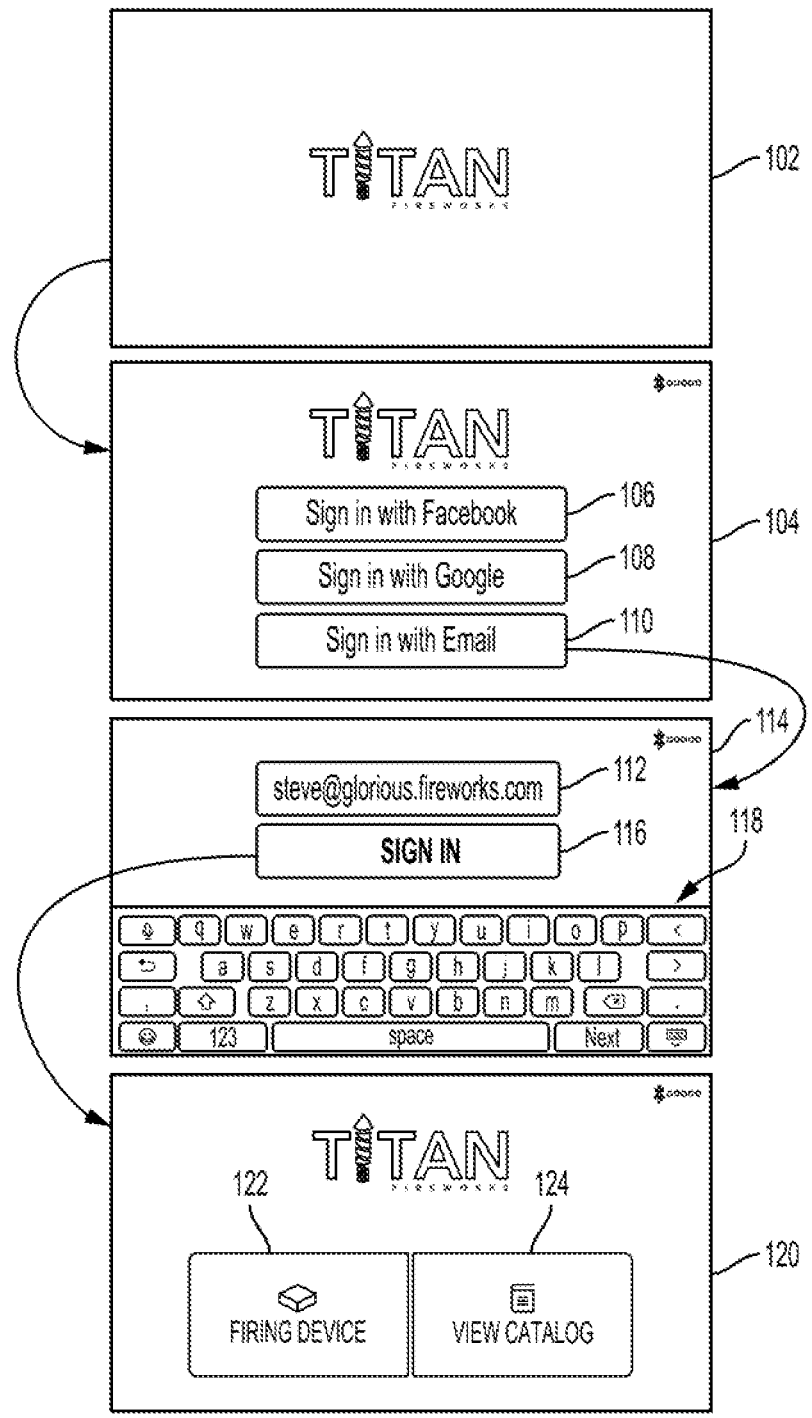
FIGS. 7A-7F show exemplary screen displays of a mobile application for automated detonation of fireworks according to principles of the present disclosure.

FIGS. 7A-G show exemplary screenshots of the mobile application 100 according to one embodiment of the present disclosure. As shown in FIG. 7A, the mobile application 100 initially displays an initial or loading screen 102 on the display 16 of the mobile device 6 when a user opens or otherwise activates the mobile application 100. For example, opening screen 102 may be displayed while the mobile application is loaded or otherwise initiated by the mobile device. After the mobile application 100 has loaded, the mobile application 100 may display a sign-in or log-in screen 104. The sign-in/log in screen 104 may include a plurality of selectable icons, virtual buttons, or other selectable areas, for example, including a selectable icon or area 106 that can be selected to provide authentication information for signing into the mobile application (FIG. 7A). For example, as shown in FIG. 7A, the selectable icons 106 can allow a user to sign into the mobile application 100 using a Facebook® account, a Google® account, an email address, or other suitable authentication information. In addition, or alternatively, the mobile application 100 can allow a user to enter authentication information, such as an email address, user name, Facebook® account, Google® account, etc., into a selectable input area 112 on log-in/sign-in screen 114, as shown in FIG. 7A. Log-in/sign-in screen 114 further can include a selectable icon or other selectable area 116 that allows for submission of the authentication information entered into the input area 112, as well as a plurality of selectable icons/areas 118, which, for example, can take the form of a keyboard or other suitable input device, to allow user entry for input of authentication information into the input area 112.

FIG. 7A further shows that if/when the entered authentication information is recognized or otherwise accepted, the mobile application 100 may show or display home screen 120. The home screen 120 can include one or more selectable icons or areas 122 that enable connection to a firing module or detonation system 4. The home screen 120 also can include one or more selectable icons or areas 124 that can be selected to allow a user to access a catalog of products or devices, such as one or more fireworks or other pyrotechnics. In one embodiment, selection of icon or area 124 may show, or direct a user to, a catalog screen on the mobile device, and the catalog screen may include a list of fireworks or other pyrotechnic devices, which list may be selectable to direct a user to a manufacture's website or other commercial website to allow the user to purchase, or obtain further information with respect to the selected fireworks or pyrotechnic devices.

Figure 7B:
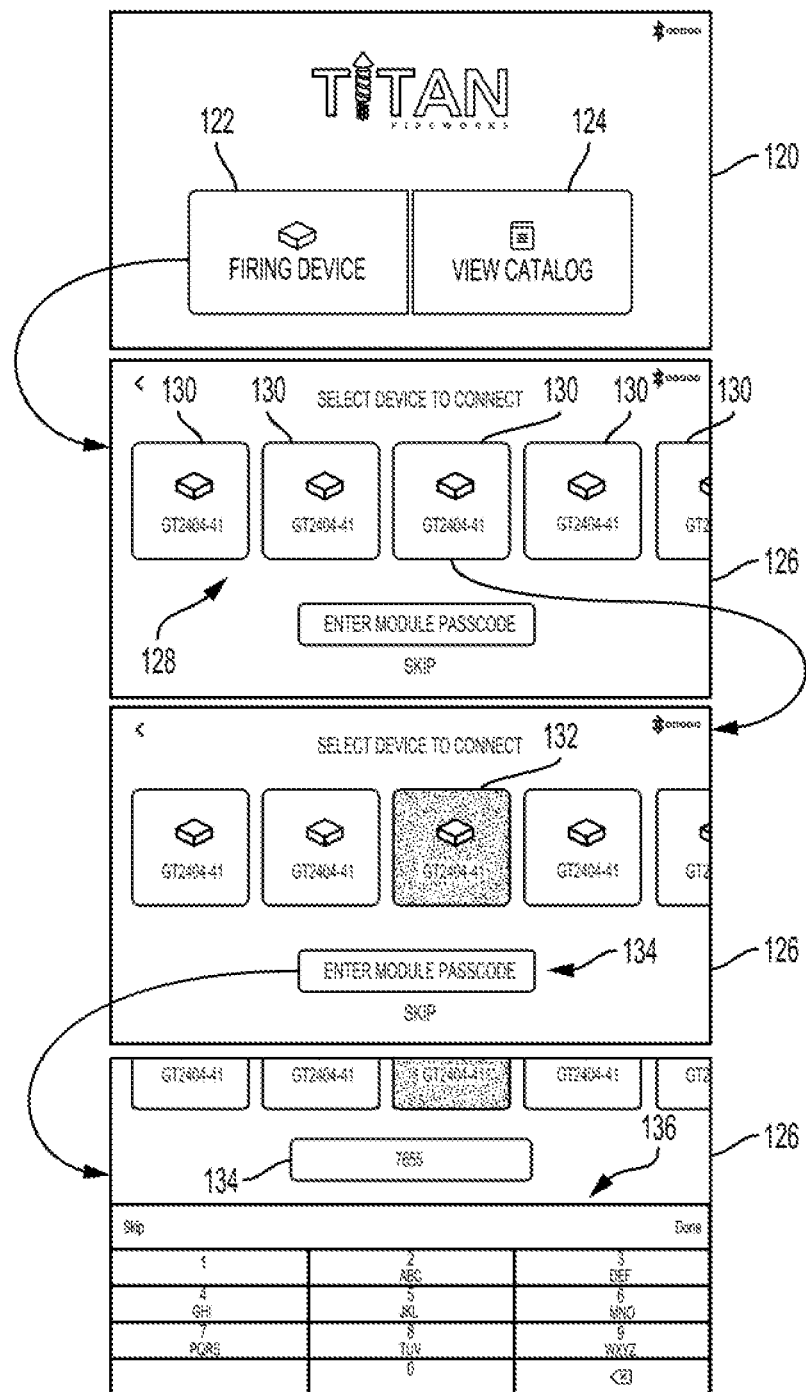

If/when the user selects the firing device icon 122, the mobile application 100 may display or show a firing module/device selection screen 126, as generally shown in FIG. 7B. The device selection screen 126 can include a selectable list or other grouping 128 of selectable icons or areas 130 that correspond to one or more control device profiles associated with specific firing modules/detonations systems 4. In one embodiment, a user can use a swipe function to scroll, toggle, or otherwise move through various icons/areas 130 of the selectable list 128 to view available control device profiles (FIG. 7B). The present disclosure is not limited to this arrangement, however, and selection of the one or more icons/areas on the device selection screen 126 may cause the mobile application to otherwise display a drop-down list, pull-down list, or other suitable grouping of available control device profiles that is superimposed on the device selection screen 128 and/or otherwise displayed on additional or alternative screens. FIG. 7B further shows that a selected control device profile icon/area 132 may change in appearance or otherwise be emphasized on the device selection screen 122. The device selection screen 126 additionally may require the user to enter a password or other authentication information, for example, into a selectable input 134, to access on the selected control device profile. As shown in FIG. 5B, selection of the selectable input 134 can cause a plurality of icons 136, having the appearance of a keyboard or other selectable input, to be superimposed or otherwise shown on the device selection screen 126 to allow for user entry of a password into the selectable input 128.

Figure 7C:
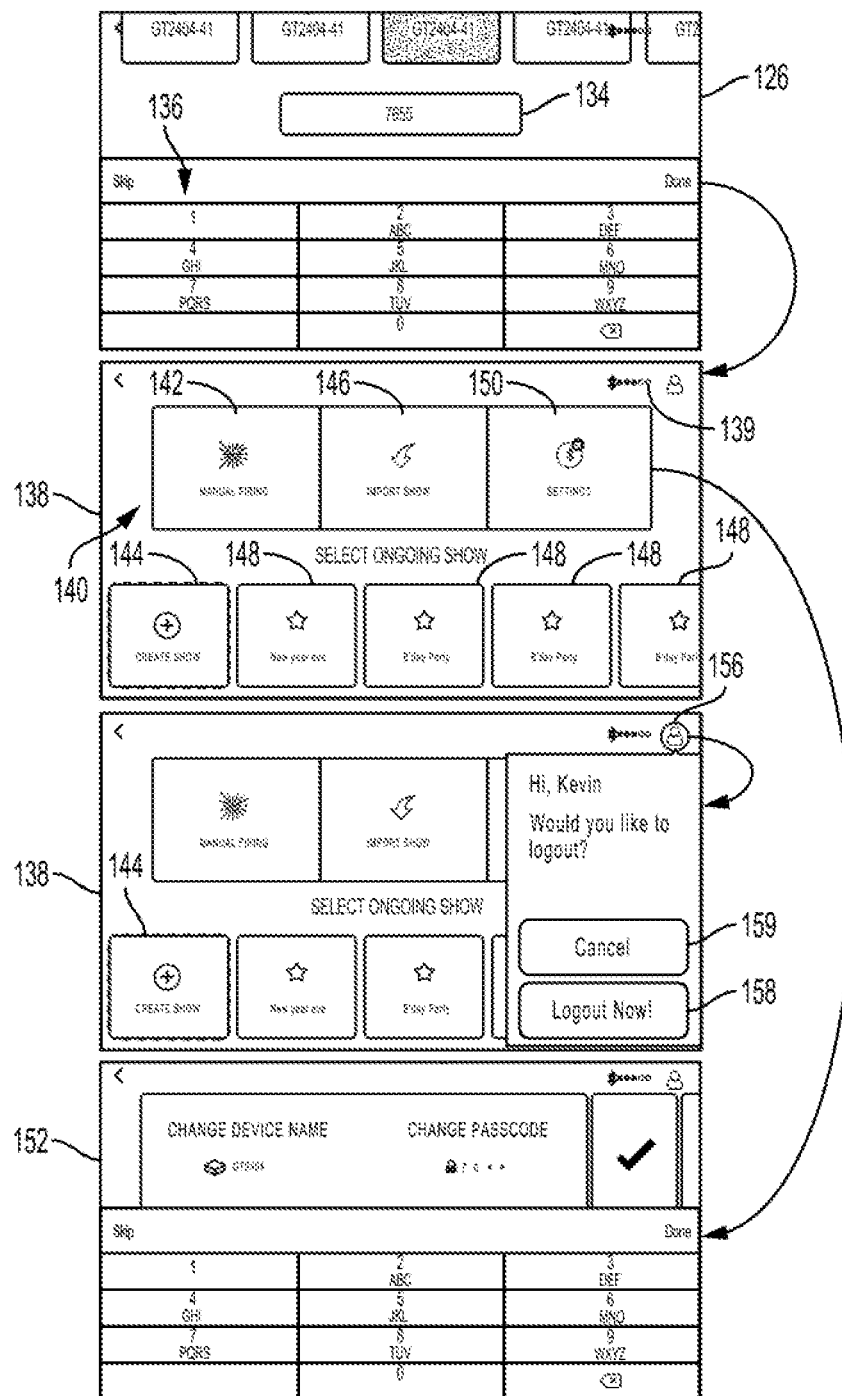

When a control device profile has been selected and/or the password for the selected control device/profile is authenticated/accepted, the mobile application 100 may display a firing module control screen 138 as generally shown in FIG. 7C. Additionally, the mobile application 100 may initiate a connection between the mobile device and one or more firing modules 4 associated with the selected control device profile. The module control screen can have a graphic, image, or other suitable indicator 139 that shows a signal strength between the mobile device and firing module. The firing module control screen 138 may include a series of selectable icons or areas 140, including one or more icons or areas 142 selectable to initiate a manual firing mode; one or more icons or areas 144 selectable to create a new custom fireworks show; one or more selectable icons/areas 146 allowing a user to import one or more existing/previously created fireworks shows; one or more selectable areas/icons 148 for loading a predefined fireworks show having a specific theme, such as a birthday or holiday theme; and an icon or area 150 that is selectable to edit or view the control device profile settings.

As shown in FIG. 5C, selection of the settings icon/area 150 may display a popup, drop-down menu/list, or settings display screen 152, including a name of the control device profile and/or password associated therewith and/or other information associated with the control device profile. The settings display screen 152 additionally may have a series of selectable icons, such as a keyboard or other suitable input 154, that allow for user input of one or more changes to the settings, such as to change the name or password associated with the control device profile. The module control screen 138 further may have a selectable icon/area 156 that allows a user to log or sign out of the module control screen 138. For example, selection of icon 156 may generate a popup box 157 having one or more selectable icons/areas 158/159 that allow user to log/sign out or cancel a log/sign out request.

Figure 7D:
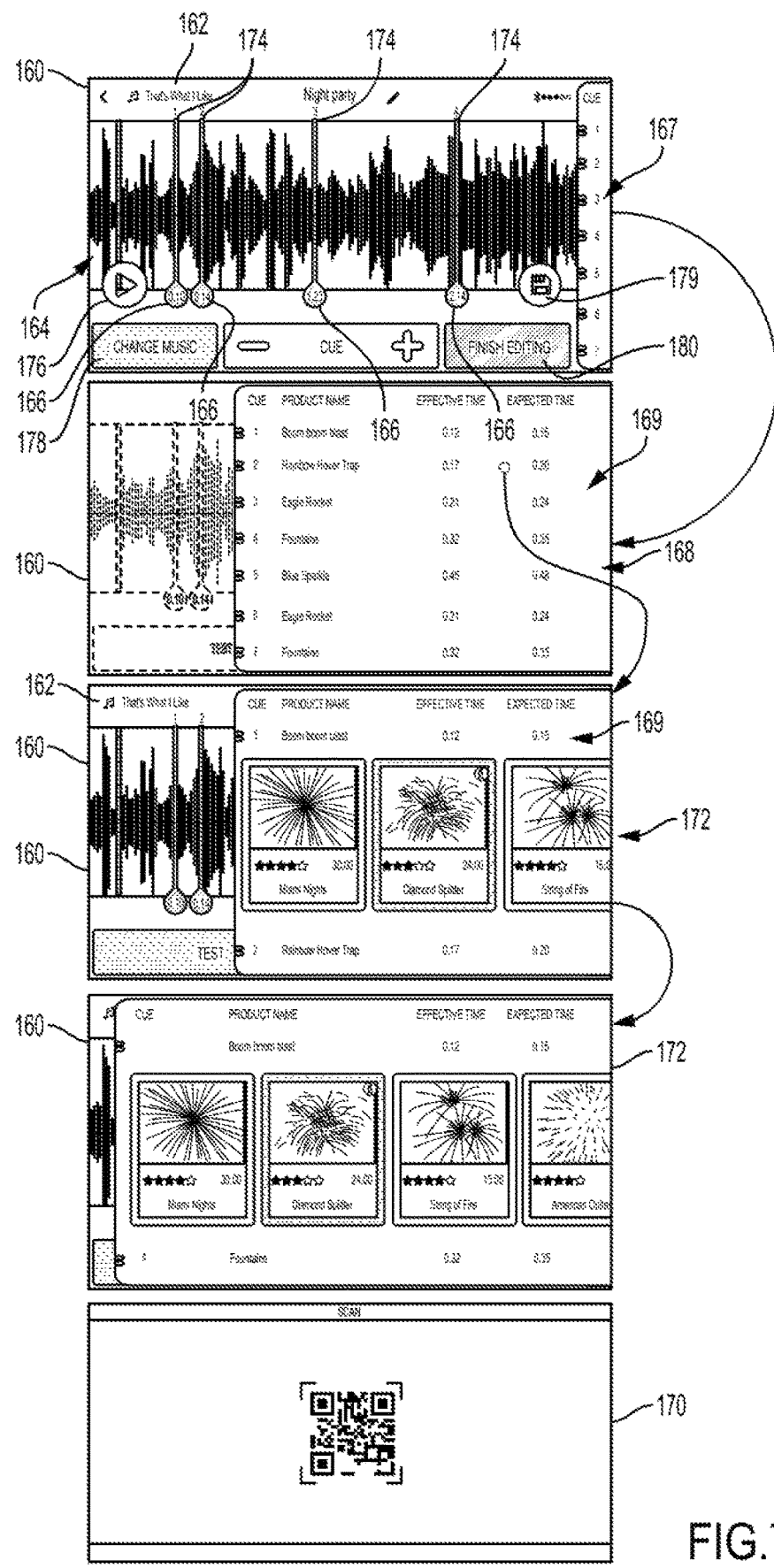
Figure 7E:
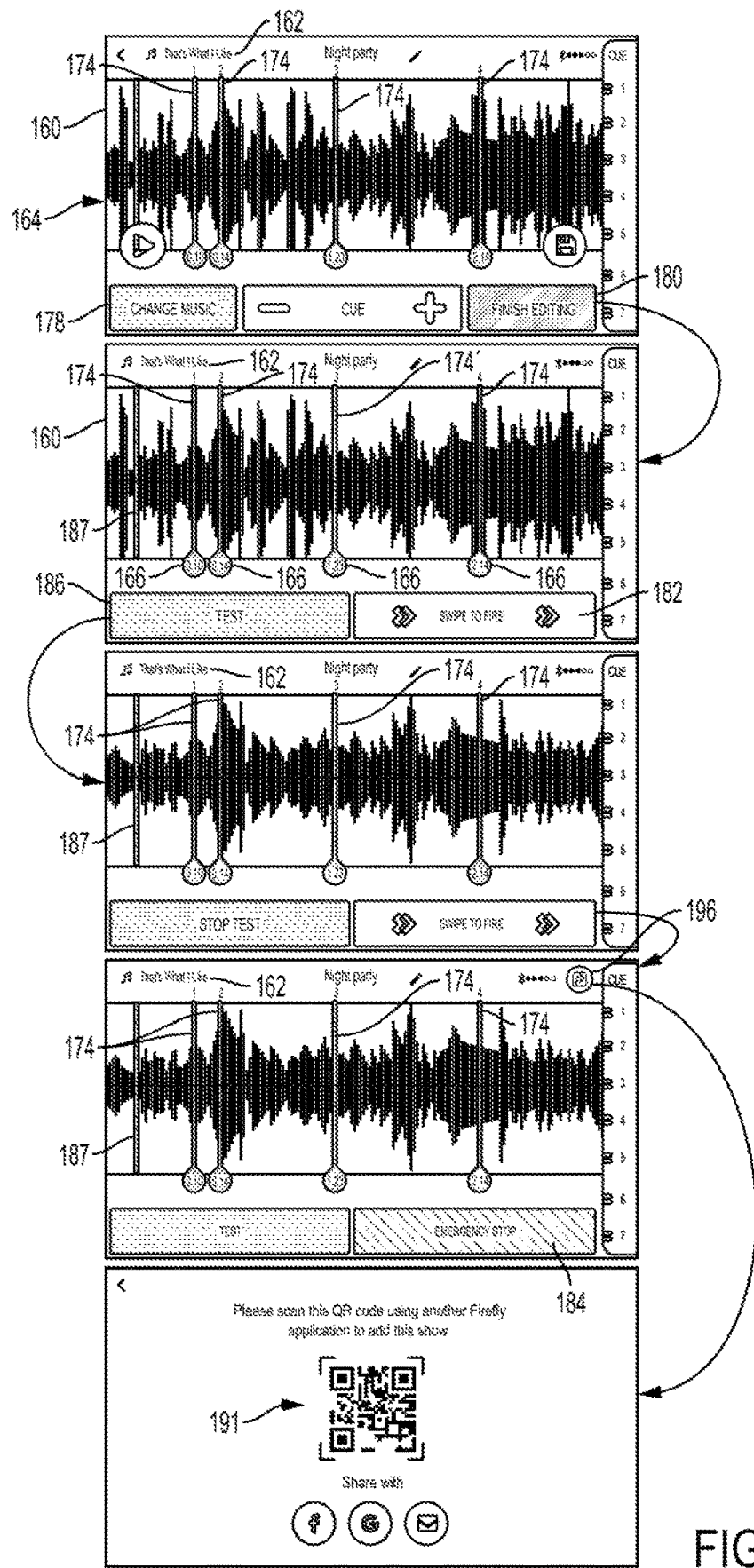

If/when a user selects the icon/area 144 to create a new show, the mobile application 100 displays a show designer screen 160 as shown in FIGS. 7D and 7E. The show designer screen 160 generally allows a user to create a custom, dynamic fireworks show, for example, that can facilitate ignition, detonation or activation of a plurality of fireworks according to a predefined sequence or pattern, which sequence or pattern may correspond to one or more aspects of a song or other selected audio played by the mobile device. The show designer screen 160 can include a portion or area 162 that indicates a selected song or other audio to be played during the custom show or display, as well as one or more graphical representations 164 of the selected song or other audio to be played. The graphical representation 164 of the selected song/audio or other audio can include an audio graph showing a magnitude of one or more aspects of the song along a vertical axis and elapsed time of the song/audio along a horizontal axis. The graphical representation, however, can include other suitable visual representations of the song/audio, such as a status bar or other graphic showing one or more aspects of the song or other audio to be played, without departing from the present disclosure. The graphical representation(s) 164 further can be selectable to allow a user to select a specific point 166 or aspect of the song/audio at which the fireworks will ignite, detonate, or otherwise be activated. The show design screen 160 further can show a selectable list 167 that corresponds to one or more detonators of the selected firing module. The selectable list 167 of detonators may be organized according to each detonator's respective position in a firing queue, and the list also may associate each listed detonator, e.g., detonators 1, 2, 3, . . . , 7, with the particular firework connected thereto or otherwise associated therewith. Items in the selectable list 167 further may be selected to display information related to corresponding fireworks. For example, selection of specific detonators in the list may generate popup window 168, or other display or display screen, that shows a list or other grouping 169 of the specific fireworks connected to each detonator of the firing module. Window 168 also can display information related to the corresponding fireworks, for example, a fuse time, flight time, or other information related to each firework (FIG. 7D).

The information corresponding to each firework may be inputted by a user or may be automatically loaded by the mobile application 100 when the user inputs firework information or the firework is otherwise identified. For example, the fireworks can include a QR code or other scan-able code disposed on one or more surfaces of the fireworks or packaging associated therewith that allows the user to scan information related to the firework(s) and load the information into a memory 20 of the mobile device 6. Such information may include a product name, a description of the product, a fuse time associated with the product, e.g., a time from lighting of the fuse to ignition of the firework, a flight time of the product, for example, a time from ignition/activation of the fuse/firework to its explosion in the air. In one embodiment, the mobile application 100 can access one or more camera(s) 40 of the mobile device 6 to allow a user to take a picture of a scan-able code located on the firework or pyrotechnic device or its packaging as shown in screen 170 in FIG. 7D. Based at least in part on information provided in this code, the mobile application 100 can access information related to the firework associated with the code from information, e.g., stored in the memory 20 of the mobile device 6 or from a network or server in connection with the mobile device.

Each item in the list or grouping 169 of detonators and corresponding fireworks further can be selectable to display a selectable list or grouping 172 of available fireworks that a user can scroll, toggle, or otherwise move through to change or assign the fireworks to the specific detonators. A user further may perform a swipe function or other suitable command to enlarge the display of the selectable list or grouping 169 on the show designer screen as shown in FIG. 7D. When a user has assigned one or more fireworks to one or more of the detonators, e.g., 1, 2, 3, . . . , 7, a user may select the specific location 166 on the graphical representation 164 of the audio in which to ignite, activate, and/or detonate each firework. For example, a user may select one of the fireworks/detonators in the selectable list 167 and then select a point along the graphical representation 164, to place an indicator 174 representing the point at which the selected firework will initiate, activate, or detonate. Accordingly, a user can select specific times or aspects of the song or other audio for detonation of each of the fireworks connected to the detonators of the firing module. The show designer screen 160 also may include an icon or selectable area 176 to play the song; an icon or selectable area 178 that allows a user to change or import a new or different song or other audio file, e.g., such as from a user's music library, iTunes® account, Spotify® account, YouTube®, Pandora®, or any other suitable music playing software or application. The show designer screen 166 further includes an icon or selectable area 179 that is selectable to allow a user to save the custom fireworks show.

Figure 7F:
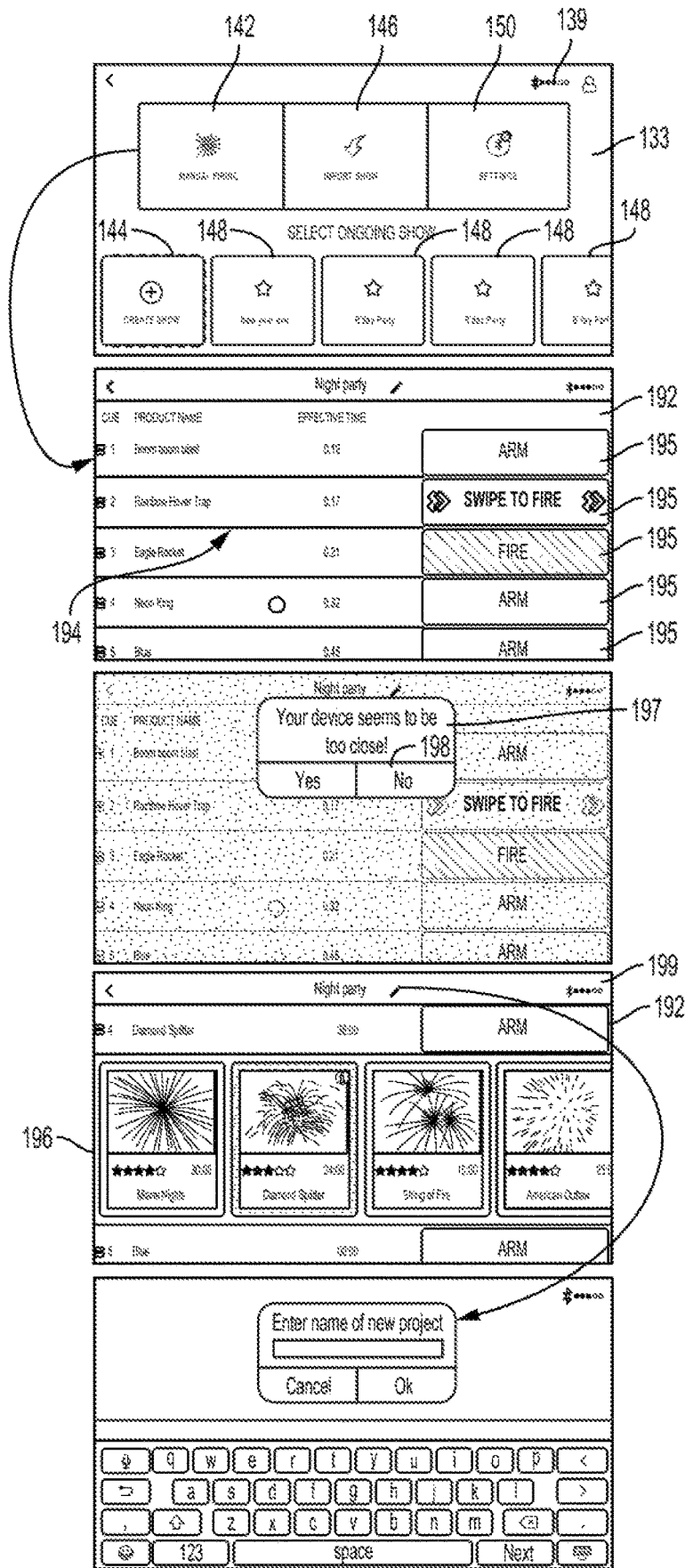

The show designer screen 160 may also include "finish editing" icon or selectable area 180 (FIGS. 5, 7D and 7E). As shown in FIG. 7F, when icon/area 180 is selected, the mobile application 100 can display a firing icon or other selectable icon or area 182 that can be selected or otherwise activated to initiate the user customized fireworks show or display. In one embodiment, a user may perform swipe function across the firing icon 182 to initiate the custom fireworks show. The firing icon 182 can be superimposed at least partially on or over the finish editing icon/area, though the firing icon can be disposed or shown at any suitable location along the show designer screen 160 without departing from this disclosure. The firing icon 182 further may be a predetermined color, e.g., green, when the selected firing module or detonators are connected to the mobile device 6, and may be a different color, e.g., red, when the firing module or detonators are not connected to the mobile device. When a user swipes or otherwise selects the firing icon 182, the mobile application 100 may operate so that the transmitter 24 of the mobile device 6 transmits one or more control signals to be received by the receiver 26 of the detonation system 4. The mobile application 100 can cause the transmitter 24 to transmit a single control signal for activation of each firework or the mobile application 100 can transmit a packet of information to the firing module 4 including instructions for detonation of one or more of the fireworks. In addition, the mobile application can use the fuse time and the flight time of the firework such that the firework detonates at the particular point or at the desired aspect of the song or audio. Upon its selection, the firing icon 182 further may transition to an emergency stop icon 184 that allows a user to immediately stop or otherwise pause execution of the custom fireworks show.

As shown in FIG. 7F, the show designer screen 182 also can have a selectable icon or area 186 to activate a test or simulation mode of the design custom fireworks show. In one embodiment, as shown in FIG. 7E, when the test icon 186 is selected, the mobile application 100 can generate a graphical simulation of the custom fireworks show. For example, the mobile device may play the selected song or other audio as a status bar or other suitable indicator 187 moves along the graphical representation 164 of the song/audio. Each indicator 174 further may illuminate, change color, flash, etc., when the status bar 187 passes thereover to indicate the specific points or aspects in the song/audio at which each firework will be activated, ignited, or detonated. The mobile application 100 additionally can display an animation that corresponds to the custom fireworks display, which animation can show a video animation or other suitable visual simulation of each firework as it is detonated, ignited, or activated during play of the song/audio. The mobile application can also access the camera(s) 40 of the mobile device 6 and can include a display that superimposes the animation or other visual simulation on to a live feed from the camera(s) 40 so as to provide a simulation of how the custom display might look at a selected location where the user intends to carry out the custom fireworks show.

The show designer screen 160 also can include an icon or selectable area 190 that is selectable to allow a user to share the custom fireworks display, for example, selection of icon 190 can generate a QR code 191 that can be scanned to share the custom fireworks display, with another mobile device running the mobile application. The custom display fireworks show, for example, can be uploaded other ways, without departing from this disclosure, e.g., to a social media website or network.

Selection of the icons/areas 148 on the firing module control screen 138 shown in FIGS. 7C and 7F may cause the mobile application 100 to display a show designer screen 160 with predefined/preselected fireworks and/or songs or other audio that generally relate to the corresponding theme thereof, e.g., Birthday party, holiday party, etc. In addition, the times or specific aspects of the song/audio in which the fireworks will be detonated, ignited, and/or activated also may be predetermined and preloaded onto the graphical representation 164.

Upon selection of the manual firing icon or area 142 on the firing module control screen 138, the mobile application may initiate a "Manual Firing" mode and show or display a manual firing screen 192 (FIG. 7F). The manual firing screen 192 may include a selectable list 194 of fireworks or pyrotechnic devices that are connected to corresponding detonators of firing device or detonator 4. This selectable list 194 of fireworks or pyrotechnic devices can include information related to each of the listed fireworks, for example, fuse times, flight times, firework type, and/or other relevant information. Upon selection or a firework or device from the selectable list 194, the mobile application 100 may cause the transmitter 24/24' of the mobile device 6 to transmit one or more control signal(s) to be received by the receiver of the connected firing module or detonator to launch or otherwise ignite the selected firework or pyrotechnic. The selectable list 194 also can include one or more selectable icons/areas 195 associated with each of the fireworks or pyrotechnics, which icons/areas 195 can have one or more indicators disposed or at least partially superimposed thereon to indicate whether the fireworks or pyrotechnics are ready to be fired or have been fired. For example, for detonators connected to the firing module, selectable icon/area 195 may indicate that such detonators are ready for firing, e.g., the indicator may state "Arm," and allow a user to arm the detonators. If a user selects one or more of the icons 195 to arm the detonators, the indicators may transition to a firing button or icon, e.g., that can be swiped or otherwise selected to fire or activate the firework connected to the corresponding detonator. During or after firing, the indicator further may transition to indicate that the firework is firing or has been fired. After the selected fireworks or pyrotechnic devices have been fired, selection of the fired or ignited fireworks or pyrotechnic devices from the list may cause the mobile application 100 to ask the user if they would like to connect and assign other fireworks to the detonators and/or buy one or more replacement for the fired fireworks or pyrotechnics. For example, a selectable list or grouping 196 of available or uploaded fireworks can be provided on the manual firing screen.

If the user is not within the predetermined "safe" zone or location upon selection of the firing button, the mobile application 100 may notify the user, for example, by a display or warning screen 197, an audio notification, or other suitable notification. The user may select an icon 198 on the warning screen 197 to override or continue with the firing such that the mobile application 100 continues to transmit the control signal(s) to execute the firing. The safe zone or location may be between about 10 feet and about 100 feet and may change depending on the selected fireworks or pyrotechnic devices. The mobile application 100 may also issue a notification if the mobile device is too far from the detonator to establish a connection.

The screens further can include a selectable icon/area to rename a manual firing profile or specific customized show (FIG. 7F).

The mobile application 100 also may access a global positioning system (GPS) of the mobile device and provide the user with information related to the fireworks based on the location of the mobile device 6. The mobile application 100 also may show maintenance information or error information with respect to components of the firing device or detonator and may also prompt a user to buy additional components of the firing device or detonator or other fireworks or pyrotechnic devices and may redirect the user to a manufacturer's website or other merchant webpage. In one embodiment, the mobile application 100 may take information related to the components of the firing device or detonator or other fireworks a user would like to purchase or request further information and input such information into a search field of a manufacturer's website or other merchants webpage so as to direct a user to a webpage where the user can buy additional components for their firing module or detonator or additional fireworks or pyrotechnics, without having to perform an individual search for the components or fireworks or pyrotechnics.

The foregoing description generally illustrates and describes various embodiments of this disclosure. It will, however, be understood by those skilled in the art that various changes and modifications can be made to the above-discussed constructions and systems without departing from the spirit and scope of this disclosure as disclosed herein, and that it is intended that all matter contained in the above description or shown in the accompanying drawings shall be interpreted as being illustrative, and not to be taken in a limiting sense. Furthermore, the scope of the present disclosure shall be construed to cover various modifications, combinations, additions, alterations, etc., above and to the above-described embodiments, which shall be considered to be within the scope of this disclosure. Accordingly, various features and characteristics as discussed herein may be selectively interchanged and applied to other illustrated and non-illustrated embodiment, and numerous variations, modifications, and additions further can be made thereto without departing from the spirit and scope of the present invention as set forth in the appended claims.

What is claimed is:

1. A mobile control system for automated detonation of a plurality of fireworks using a mobile device, comprising:
   at least one detonation wire assembly including a detonation wire with a connector at one end thereof and a firework connection assembly at an opposing end thereof, the firework connection assembly being configured to facilitate connection of the detonation wire to one or more fireworks of the plurality of fireworks, and the firework connection assembly including;
      a connector housing having at least a first section and at least a second section opposite the first section, the first and second sections at least partially surrounding and defining an ignition chamber;
      at least one heating element positioned at least partially within the ignition chamber along the first section of the connector housing that is operable to ignite a fuse of a firework of the plurality of fireworks placed into engagement therewith; and
      an engagement portion arranged at least partially along the second section of the connector housing and configured to substantially maintain engagement between the fuse and the heating element; and
   a firing module configured to activate the plurality of fireworks, the firing module including:
      a plurality of detonators each configured to ignite one or more fireworks of the plurality of fireworks connected thereto;
      a receiver operable to receive one or more control signals transmitted by the mobile device;
      a controller that activates at least one detonator of the plurality of detonators to ignite at least one firework of the plurality of fireworks when the receiver receives the one or more of the control signals from the mobile device; and
      a firing module housing defining a chamber that receives the plurality of detonators, the receiver, and the controller, the firing module housing including one or more wall portions with at least one port defined therein, the at least one port corresponding to at least one detonator of the plurality of detonators and being configured to receive the connector of the detonation wire of the at least one detonation wire assembly; and
   a mobile application running on the mobile device, the mobile application comprising a plurality of control display screens that enables remote user control of the firing module using the mobile device, and, using a processor of the mobile device, the mobile application generates the one or more control signals to be transmitted by the mobile device to the firing module to ignite the plurality of fireworks, the plurality of control display screens comprising at least one manual firing screen including one or more selectable areas corresponding to each detonator of the plurality of detonators to facilitate manual activation thereof; and at least one show designer screen including one or more selectable areas operable to generate one or more customized fireworks shows that enable ignition or detonation of the plurality of fireworks according to a defined sequence or pattern.

2. The mobile control system of claim 1, wherein, the control signals comprise one or more wireless signals generated by a transmitter of the mobile device.

3. The mobile control system of claim 1, wherein the defined sequence or pattern can be based at least in part on one or more songs or audio files accessed by the mobile device.

4. The mobile control system of claim 1, wherein the mobile application determines a proximity, location, and/or zone of the mobile device in relation to the firing module and/or one or more fireworks in communication therewith, and the mobile application provides a notification to the user if the mobile device is within a predetermined proximity, location, or zone in relation to the firing module and/or at least one firework in communication therewith.

5. The mobile control system of claim 4, wherein the proximity, location, or zone of the mobile device is determined based at least in part on a signal strength between the mobile device and the firing module.

6. The mobile control system of claim 1, wherein at least one portion of the firing module housing includes an indicator disposed therealong, the indicator corresponding to the at least one port.

7. The mobile control system of claim 1, wherein the receiver of the firing module is configured to receive the one or more control signals directly from the mobile device.

8. The mobile control system of claim 1, wherein the at least one show designer screen further includes a portion or area that indicates a selected song or audio to be played during a customized fireworks show, a visual representation of the selected song or audio to be played during the customized fireworks show, a selectable list that corresponds to one or more detonators of the plurality of detonators, and a firing icon that is selectable to initiate the one or more customized fireworks shows.

9. The mobile control system of claim 8, wherein the visual representation of the selected song or audio includes a graphical representation including information related to one or more aspects of the selected song or audio along a one axis thereof, and wherein the graphical representation is selectable to allow selection of a specific point or aspect of the selected song or audio at which one or more fireworks of the plurality of fireworks will initiate, activate, or detonate.

10. The mobile control system of claim 1, wherein the at least one show designer screen includes an icon or selectable area that allows users to share or send the one or more customized fireworks shows with other mobile devices.

11. The mobile control system of claim 10, wherein upon selection of the icon or selectable area that allows users to share the one or more customized fireworks shows, the mobile application is configured to generate at least one code that can be scanned by the other mobile devices to share the one or more customized fireworks shows with the other mobile devices.

12. The mobile control system of claim 1, wherein the at least one heating element includes a coiled wire.

13. A mobile control system for automated detonation of fireworks using a mobile device, comprising:
- a plurality of detonation wires each including a firing module connector at one end and a firework connection assembly at an opposite end, the firework connection assembly including at least one heating element that is operable to ignite a fuse of a firework placed into engagement therewith, and a housing having a first section and a second section that at least partially surround and define an ignition chamber at least partially receiving the at least one heating element, the first section and the second section being configured to engage the fuse therebetween to maintain sufficient contact between the fuse and the heating element to facilitate activation of the fuse;
- a firing module with a firing module housing defining a chamber that receives a plurality of detonators, a receiver, and a controller, the plurality of detonators each being configured to ignite one or more corresponding fireworks of a plurality of fireworks connected to the firing module, the receiver being operable to receive one or more control signals transmitted by the mobile device, and the controller being operable to activate the plurality of detonators to ignite the plurality of fireworks when the receiver receives the one or more of the control signals from the mobile device, the firing module housing including one or more wall portions with a plurality of ports defined therein, each of the plurality of ports corresponding to a detonator of the plurality of detonators and facilitating connection between the detonator and a corresponding detonation wire of the plurality of detonation wires; and
- an mobile application running on the mobile device, the mobile application including a plurality of control display screens that enables remote user control of the firing module using the mobile device, the mobile application facilitating the generation of the one or more control signals to be transmitted by the mobile device for ignition of the plurality of fireworks, the plurality of control display screens comprising at least one manual firing screen that facilitates individual activation of each detonator of the plurality of detonators, and at least one show designer screen including one or more selectable areas operable to facilitate generation of one or more customized fireworks shows that enable ignition or detonation of the plurality of fireworks according to a defined sequence or pattern.

14. The mobile control system of claim 13, wherein the mobile application further includes a device selection screen that includes a selectable list of icons corresponding to one or more control device profiles associated with one or more available firing modules.

15. The mobile control system of claim 13, wherein the show designer screen includes information related to a selected song or audio to be played during the one or more customized fireworks shows, an audio graphic showing one or more aspects of the selected song or audio, and/or a selectable list corresponding to one or more detonators of the plurality of detonators in the firing module housing.

16. The mobile control system of claim 13, wherein the receiver of the firing module is configured to receive the one or more control signals directly from the mobile device.

17. The mobile control system of claim 13, wherein the at least one show designer screen further includes a portion or area that indicates a selected song or audio to be played during a customized fireworks show, a visual representation of the selected song or audio to be played during the customized fireworks show, and a selectable list that corresponds to one or more detonators of the plurality of detonators.

18. The mobile control system of claim 17, wherein the visual representation of the selected song or audio includes a graphical representation including information related to one or more aspects of the selected song or audio along an axis of the graphical representation.

19. The mobile control system of claim 18, wherein the graphical representation is selectable to allow selection of a specific point or aspect of the selected song or audio at which one or more fireworks of the plurality of fireworks will initiate, activate, or detonate.

20. The mobile control system of claim 19, wherein the show designer screen includes a firing icon that is selectable to initiate the one or more customized fireworks shows.

* * * * *